United States Patent
Li et al.

(10) Patent No.: US 12,479,922 B2
(45) Date of Patent: Nov. 25, 2025

(54) HUMANIZED MONOCLONAL ANTIBODY TARGETING BCMA AND HAVING HUMAN MONKEY CROSS-REACTIVITY

(71) Applicant: CytoLynX Therapeutics Hong Kong Limited, Hong Kong (CN)

(72) Inventors: Ning Li, Jiangsu (CN); Guoqing Cao, Jiangsu (CN); Guojun Lang, Shanghai (CN); Chanjuan Liu, Shanghai (CN); Yuhao Hu, Shanghai (CN)

(73) Assignee: CYTOLYNX THERAPEUTICS HONG KONG LIMITED, Hong Kong (CN)

( * ) Notice: Subject to any disclaimer, the term of this patent is extended or adjusted under 35 U.S.C. 154(b) by 883 days.

(21) Appl. No.: 17/766,371

(22) PCT Filed: Sep. 25, 2020

(86) PCT No.: PCT/CN2020/117757
§ 371 (c)(1),
(2) Date: Apr. 4, 2022

(87) PCT Pub. No.: WO2021/068761
PCT Pub. Date: Apr. 15, 2021

(65) Prior Publication Data
US 2024/0052048 A1 Feb. 15, 2024

(30) Foreign Application Priority Data
Oct. 10, 2019 (CN) .......................... 201910960313.4

(51) Int. Cl.
*C07K 16/28* (2006.01)
*A61P 35/00* (2006.01)

(52) U.S. Cl.
CPC .......... *C07K 16/2878* (2013.01); *A61P 35/00* (2018.01); *C07K 2317/33* (2013.01); *C07K 2317/565* (2013.01)

(58) Field of Classification Search
CPC ............................ C07K 16/2878; A61P 35/00
See application file for complete search history.

(56) References Cited

U.S. PATENT DOCUMENTS

2013/0280280 A1 10/2013 Algate et al.
2021/0079108 A1 3/2021 Oden et al.

FOREIGN PATENT DOCUMENTS

| | | | | |
|---|---|---|---|---|
| CN | 108350073 | | 7/2018 | |
| CN | 110229232 A | * | 9/2019 | .............. A61P 35/00 |
| EP | 3 331 910 | | 12/2019 | |
| EP | 3 693 394 | | 8/2020 | |
| EP | 3 912 997 | | 11/2021 | |
| JP | 2014-520088 | | 8/2014 | |
| JP | 2016-511277 | | 4/2016 | |
| JP | 2017-515470 | | 6/2017 | |
| WO | WO-2013072415 A1 | * | 5/2013 | .............. A61P 43/00 |
| WO | 2014/140248 | | 9/2014 | |
| WO | 2017/021450 | | 2/2017 | |

OTHER PUBLICATIONS

International Search Report issued Dec. 30, 2020, in International (PCT) Application No. PCT/CN2020/117757, with English translation.
Liu Min-jie at al., "Research progress in B cell maturation antigen-targeted immunotherapy in multiple myeloma", Journal of Lanzhou University (Medical Sciences), vol. 45, No. 4, 2019, pp. 67-73, with English abstract.
Erik Eckhert et al., "B-cell maturation antigen directed monoclonal antibody therapies for multiple myeloma", Immunotherapy, vol. 11, No. 9, 2019, pp. 801-811.

* cited by examiner

*Primary Examiner* — Janet L Epps-Smith
*Assistant Examiner* — Nada Ahmed Mahmou Elmansy
(74) *Attorney, Agent, or Firm* — Wenderoth, Lind & Ponack, L.L.P.

(57) ABSTRACT

Provided is an isolated monoclonal antibody targeting B-cell maturation antigen (BCMA), the antibody can bind to both human BCMA and monkey BCMA. Also provided are a nucleic acid encoding the antibody, a method for producing the antibody, and a pharmaceutical composition comprising the antibody.

11 Claims, 15 Drawing Sheets
Specification includes a Sequence Listing.

| Detection items<br>Candidate<br>Antibodies | Affinity effect with human BCMA at ELISA level | Affinity effect with monkey BCMA at ELISA level | The effect of blocking the binding of human BCMA to human BAFF at ELISA level | The effect of blocking the binding of human BCMA to human APRIL at ELISA level | Affinity effect with human BCMA at cell level | Affinity effect with monkey BCMA at cell level | Endocytosis on myeloma cell H929 |
|---|---|---|---|---|---|---|---|
| SY14-3rd-5-6-7 | ++++ | ++++ | ++++ | ++++ | ++++ | ++++ | ++++ |
| SY14-3rd-5-6-32 | ++++ | ++++ | ++++ | ++++ | N/A | N/A | ++++ |
| GSK2857916 | ++++ | ++++ | ++++ | ++++ | ++++ | ++++ | ++++ |

Figure 7

| Detection Indicators / Antibody names | Number of reverse mutations | | Humanization ratio | | | Detecting the affinity effect of the candidate antibodies to BCMA at ELISA level | | Detecting the effect of candidate antibodies to block the binding of human BCMA to ligand at ELISA level | | Detecting the affinity effect of the candidate antibodies to BCMA at cell level | | | Endocytosis effect |
|---|---|---|---|---|---|---|---|---|---|---|---|---|---|
| | VH | VL | VH | VL | VH+VL | Human BCMA | Monkey BCMA | Human BAFF | Human APRIL | Human BCMA-HEK293 cells | Monkey BCMA-CHO cells | Myeloma H929 cells | Myeloma H929 cells |
| 5-6-7-WT | N/A | N/A | N/A | N/A | N/A | ++++ | ++++ | ++++ | ++++ | +++++ | +++++ | ++++ | ++++ |
| 5-6-7-hu-2 | 4 | 2 | 95.5% | 97.6% | 96.5% | +++++ | +++++ | +++++ | ++++ | +++++ | +++++ | ++++ | +++++ |
| 5-6-32-WT | N/A | N/A | N/A | N/A | N/A | +++++ | +++++ | +++++ | +++++ | +++++ | +++++ | +++++ | +++++ |
| 5-6-32-hu-2 | 4 | 1 | 95.5% | 98.8% | 97.1% | +++++ | +++++ | +++ | +++ | ++++ | +++++ | +++++ | +++++ |
| GSK2857916 | N/A | N/A | N/A | N/A | N/A | +++++ | +++++ | ++++ | ++++ | ++++ | ++++ | ++++ | ++++ |

Figure 14

HUMANIZED MONOCLONAL ANTIBODY TARGETING BCMA AND HAVING HUMAN MONKEY CROSS-REACTIVITY

TECHNICAL FIELD

The present invention relates to a monoclonal antibody and a fragment thereof specifically binding to B cell maturation antigen (BCMA), including specifically binding to human BCMA and monkey BCMA antigens at the same time.

The present invention relates to a monoclonal antibody and a fragment thereof specifically binding to BCMA and inhibiting the binding of BAFF and APRIL to a BCMA receptor.

The present invention also relates to a monoclonal antibody and a fragment thereof specifically binding to BCMA and having excellent endocytosis effects.

BACKGROUND ART

B cells mature in the bone marrow and become plasma cells, which can secrete antibodies against foreign viruses or bacteria. When plasma cells become cancerous to be myeloma cells, they will continue to proliferate to produce more malignant myeloma cells and secrete large amounts of useless antibodies. Myeloma usually grows on the spine, skull, pelvis, thoracic cavity, etc., and manifests as a tumor or osteolytic disease. The condition of myeloma is usually gradual, from monoclonal gammopathy of undermined significance (MGUS) to low-risk smoky multiple myeloma, and to high-risk smoky multiple myeloma (SMM), eventually progressing to multiple myeloma (*Nature Reviews Disease Primers*, 2017, 3, 17046.). The main manifestations of multiple myeloma (MM) include hypercalcemia, renal dysfunction, anemia, bone dysfunction, etc., accompanied by severe bone pain and prone to repeated fractures (*Nature Reviews Clinical Oncology*, 2012, 9 (3), 135-143.). According to statistics from the International Myeloma Foundation, as of August 2017 alone, the number of patients worldwide has reached about 750,000, with approximately 114,000 new cases each year, and nearly 90,000 deaths from the disease.

B cell maturation antigen (BCMA), a member of the tumor necrosis factor superfamily, is mainly expressed on the surface of memory cells, plasmablasts and plasma cells, but almost not expressed on the surface of other cells. On the other hand, BCMA belongs to transmembrane receptor on the cell surface, its gene is located at the TNFRSF17 locus of chromosome 16. It has been reported in the literature (*Blood Cancer Journal*, 2015, 5(2), e282-e282.) that BCMA-deficient mice are relatively normal in appearance and the number of B cells, but their plasma cell survival ability is extremely poor.

The ligands of BCMA include B cell activating factor (BAFF) and proliferation-inducing ligand (APRIL), wherein the receptors of BAFF also include BAFF-R and TACI, and the receptors of APRIL also include TACI. The main role of the BCMA signaling pathway is to promote the survival and differentiation of B cells and the activation of regulatory T cells; on the contrary, the TACI signaling pathway inhibits the maturation of B cells (*Nature reviews immunology*, 2009, 9(7): 491.). For these three receptors (BAFF-R, TACI and BCMA), during the development of B cells, only BAFF-R is expressed on the surface of immature B cells, migrating B cells and initial B cells; both BAFF-R and BCMA are expressed on the surface of GC B cells; BAFF-R, TACI and BCMA are expressed on the surface of memory cells; TACI and BCMA are expressed on the surface of plasmablasts or plasma cells; and when plasma cells become cancerous to be multiple myeloma cells, BCMA is highly expressed on its surface, and it is possible to express TACI but not BAFF-R (*Nature reviews immunology*, 2009, 9(7): 491.). It can be seen that most B cells do not express BCMA. In addition, studies have shown that cells in other organs hardly express BCMA. Clinically, patients with multiple myeloma have higher levels of BCMA, BAFF and APRIL in the serum, and the overall survival and prognosis are worse. Accordingly, in the treatment of multiple myeloma, BCMA is a new target superior to CD19, etc., with high specificity and fewer side effects of the target. Therefore, the development of antibody drugs with blocking effect or endocytosis effect against the BCMA target may not only improve the therapeutic effect of multiple myeloma, but also greatly reduce the side effects of the therapy, and may produce huge economic and social value.

At present, in terms of ADC (antibody-drug conjugate) drugs, the Belantamab mafodotin (abbreviated as GSK2857916) jointly developed by Glaxo Group and Seattle Genetics is effective. Among the 35 over-pretreatment (most patients received at least 5 therapies, and the treatment failed) R/R MM patients, ORR reached 60%, and the median PFS (Progression-Free-Survival) was 12 months (NCT03848845). In terms of CAR-T cells, the CAR-T cell therapy Idecabtagene vicleucel (abbreviated as bb2121) of Celgene & Bluebird Bio, among 33 R/R MM patients who have failed at least 3 therapies in the past, the total remission rate reached 85%, the median PFS was 11.8 months (NCT02658929). In terms of bispecific antibodies, Amgen's AMG 420 is the fastest-advanced therapy; this type of antibody is smaller than traditional antibodies, and is composed of two antibody domain fragments, it has good activity, but has a shorter half-life than full-length antibodies (NCT02514239). In terms of clinical results, drugs targeting BMCA targets, whether monoclonal antibodies, double antibodies, ADCs or CAR-T cell therapy, have achieved impressive results, and clinical results show that the side effects of BCMA targets is also much lower than other targets.

CONTENTS OF THE INVENTION

Based on the above background, the object of the present invention is to develop a novel antibody targeting BCMA.

In the present invention, BCMA is used as an immunogen to immunize mice, and an antibody library is constructed and screened through phage display technology to obtain monoclonal antibodies that simultaneously bind to human and monkey BCMA antigens. Subsequent humanization of antibodies was used to transform murine monoclonal antibodies into humanized antibodies. Through functional experiments such as affinity, blocking, and endocytosis experiments, it was confirmed that the candidate humanized antibodies exhibited excellent functions, the endocytosis function at the cellular level is better than that of the competitor GSK2857916.

All patents and references disclosed in this specification are clearly and completely incorporated herein by reference.

The present invention relates to an isolated monoclonal antibody targeting B cell maturation antigen (BCMA), wherein the antibody can bind to both human BCMA and monkey BCMA.

In a particular aspect, the antibody according to the present invention comprises a heavy chain variable region comprising a heavy chain complementarity determining region 1 (CDR-H1) represented by SEQ ID NO: 1 or 2, and/or comprising a heavy chain complementarity determining region 2 (CDR-H2) represented by SEQ ID NO: 3 or 4, and/or comprising a heavy chain complementarity determining region 3 (CDR-H3) represented by SEQ ID NO: 5 or 6.

In a particular aspect, the antibody according to the present invention comprises a light chain variable region comprising a light chain complementarity determining region 1 (CDR-L1) represented by SEQ ID NO: 7 or 8, and/or comprising a light chain complementarity determining region 2 (CDR-L2) represented by SEQ ID NO: 9 or 10, and/or comprising a light chain complementarity determining region 3 (CDR-L3) represented by SEQ ID NO: 11 or 12.

In a particular aspect, the antibody according to the present invention comprises a heavy chain variable region and a light chain variable region, wherein the heavy chain variable region comprises: a heavy chain complementarity determining region 1 (CDR-H1) represented by SEQ ID NO: 1 or 2, and/or a heavy chain complementarity determining region 2 (CDR-H2) represented by SEQ ID NO: 3 or 4, and/or a heavy chain complementarity determining region 3 (CDR-H3) represented by SEQ ID NO: 5 or 6; and the light chain variable region comprises: a light chain complementarity determining region 1 (CDR-L1) represented by SEQ ID NO: 7 or 8, and/or a light chain complementarity determining region 2 (CDR-L2) represented by SEQ ID NO: 9 or 10, and/or a light chain complementarity determining region 3 (CDR-L3) represented by SEQ ID NO: 11 or 12.

In a particular aspect, the antibody according to the present invention comprises a variant of the above antibody, and has the same or similar activity as the above antibody according to the present invention.

In a particular aspect, the antibody according to the present invention comprises a light chain variable region comprising the amino acid sequence represented by SEQ ID NO: 13 or 14, or a variant of the above sequence.

In a particular aspect, the antibody according to the present invention comprises a heavy chain variable region comprising the amino acid sequence represented by SEQ ID NO: 15 or 16, or a variant of the above sequence.

In a particular aspect, the antibody according to the present invention comprises a light chain variable region and a heavy chain variable region, wherein the light chain variable region comprises the amino acid sequence represented by SEQ ID NO: 13 or 14, or a variant of the above sequence; and the heavy chain variable region comprises the amino acid sequence represented by SEQ ID NO: or 16, or a variant of the above sequence.

In a particular aspect, the heavy chain variable region of the antibody according to the present invention comprises CDR-H1 represented by SEQ ID NO: 1, CDR-H2 represented by SEQ ID NO: 3, and CDR-H3 represented by SEQ ID NO: 5.

In a particular aspect, the heavy chain variable region of the antibody according to the present invention comprises CDR-H1 represented by SEQ ID NO: 2, CDR-H2 represented by SEQ ID NO: 4, and CDR-H3 represented by SEQ ID NO: 6.

In a particular aspect, the light chain variable region of the antibody according to the present invention comprises CDR-L1 represented by SEQ ID NO: 7, CDR-L2 represented by SEQ ID NO: 9, and CDR-L3 represented by SEQ ID NO: 11.

In a particular aspect, the light chain variable region of the antibody according to the present invention comprises: CDR-L1 represented by SEQ ID NO: 8, CDR-L2 represented by SEQ ID NO: 10, and CDR-L3 represented by SEQ ID NO: 12.

In a particular aspect, the light chain variable region of the antibody according to the present invention has the sequence represented by SEQ ID NO: 13 or 14, or has a sequence with at least 80%, for example, 85%, 90%, 91%, 92%, 93%, 94%, 95%, 96%, 97%, 98%, 99% similarity to any one of the above sequences.

In a particular aspect, the heavy chain variable region of the antibody according to the present invention has the sequence represented by SEQ ID NO: 15 or 16, or has a sequence with at least 80%, for example, 85%, 90%, 91%, 92%, 93%, 94%, 95%, 96%, 97%, 98%, 99% similarity to any one of the above sequences.

In a particular aspect, the antibody according to the present invention comprises a heavy chain variable region and a light chain variable region, wherein the heavy chain variable region comprises: CDR-H1 represented by SEQ ID NO: 1, CDR-H2 represented by SEQ ID NO: 3, and CDR-H3 represented by SEQ ID NO: 5; and the light chain variable region comprises: CDR-L1 represented by SEQ ID NO: 7, CDR-L2 represented by SEQ ID NO: 9, and CDR-L3 represented by SEQ ID NO: 11.

Further, the light chain variable region of the antibody has the sequence represented by SEQ ID NO: 13, or has a sequence with at least 80%, for example, 85%, 90%, 91%, 92%, 93%, 94%, 95%, 96%, 97%, 98%, 99% similarity to any one of the above sequence; the heavy chain variable region of the antibody has the sequence represented by SEQ ID NO: 15, or has a sequence with at least 80%, for example, 85%, 90%, 91%, 92%, 93%, 94%, 95%, 96%, 97%, 98%, 99% similarity to any one of the above sequence.

In a particular aspect, the antibody according to the present invention comprises a heavy chain variable region and a light chain variable region, wherein the heavy chain variable region comprises: CDR-H1 represented by SEQ ID NO: 2, CDR-H2 represented by SEQ ID NO: 4, and CDR-H3 represented by SEQ ID NO: 6; the light chain variable region comprises: CDR-L1 represented by SEQ ID NO: 8, CDR-L2 represented by SEQ ID NO: 10, and CDR-L3 represented by SEQ ID NO: 12.

Further, the light chain variable region of the antibody has the sequence represented by SEQ ID NO: 14, or has a sequence with at least 80%, for example, 85%, 90%, 91%, 92%, 93%, 94%, 95%, 96%, 97%, 98%, 99% similarity to any one of the above sequence; the heavy chain variable region of the antibody has the sequence represented by SEQ ID NO: 16, or has a sequence with at least 80%, for example, 85%, 90%, 91%, 92%, 93%, 94%, 95%, 96%, 97%, 98%, 99% similarity to any one of the above sequence.

The present invention also relates to a monoclonal antibody targeting B cell maturation antigen (BCMA), wherein the antibody recognizes the same epitope as the above antibody according to the present invention.

The present invention also relates to a monoclonal antibody targeting B cell maturation antigen (BCMA), wherein the antibody competitively binds to B cell maturation antigen (BCMA) with the above antibody according to the present invention.

The present invention also relates to a nucleic acid encoding the above antibody according to the present invention.

The present invention also relates to an expression vector comprising the above nucleic acid according to the present invention.

The present invention also relates to a host cell comprising the above expression vector according to the present invention or a genome integrated with the above nucleic acid according to the present invention.

The present invention also relates to a method for producing a monoclonal antibody, wherein the method comprises culturing the host cell according to the present invention to produce the above monoclonal antibody according to the present invention.

The present invention also relates to a pharmaceutical composition comprising the monoclonal antibody according to the present invention and a pharmaceutically acceptable carrier.

The present invention also relates to a kit or product comprising the monoclonal antibody according to the present invention or the pharmaceutical composition according to the present invention.

The present invention also relates to a method for treating a disease related to the expression of BCMA, wherein the method comprises: administrating the monoclonal antibody according to the present invention or the pharmaceutical composition according to the present invention or the kit or product according to the present invention to a subject in need thereof.

In a particular aspect, the above disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome.

In a particular aspect, the above disease is multiple myeloma.

The present invention also relates to use of the monoclonal antibody according to the present invention in the preparation of a medicament for treating a disease related to the expression of BCMA.

In a particular aspect, the above disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome.

In a particular aspect, the above disease is multiple myeloma.

Particularly, the present invention relates to the following aspects:

1. An isolated monoclonal antibody targeting B cell maturation antigen (BCMA), wherein the antibody can bind to both human BCMA and monkey BCMA.
2. The monoclonal antibody according to item 1, which is selected from any one of the following:
(1) an antibody comprising a heavy chain variable region, wherein the heavy chain variable region comprises: a heavy chain complementarity determining region 1 (CDR-H1) represented by SEQ ID NO: 1 or 2, and/or a heavy chain complementarity determining region 2 (CDR-H2) represented by SEQ ID NO: 3 or 4, and/or a heavy chain complementarity determining region 3 (CDR-H3) represented by SEQ ID NO: 5 or 6;
(2) an antibody comprising a light chain variable region, wherein the light chain variable region comprises: a light chain complementarity determining region 1 (CDR-L1) represented by SEQ ID NO: 7 or 8, and/or a light chain complementarity determining region 2 (CDR-L2) represented by SEQ ID NO: 9 or 10, and/or a light chain complementarity determining region 3 (CDR-L3) represented by SEQ ID NO: 11 or 12;
(3) an antibody comprising the heavy chain variable region of the antibody of the above (1) and the light chain variable region of the antibody of the above (2);
(4) an antibody as a variant of the antibody of any one of the above (1) to (3), and having the same or similar activity as the antibody of any one of the above (1) to (3).
3. The antibody according to item 1 or 2, characterized in that the antibody is selected from any one of the following:
(1) an antibody comprising a light chain variable region, wherein the light chain variable region comprises the amino acid sequence represented by SEQ ID NO: 13 or 14, or a variant of the above sequence;
(2) an antibody comprising a heavy chain variable region, wherein the heavy chain variable region comprises the amino acid sequence represented by SEQ ID NO: 15 or 16, or a variant of the above sequence;
(3) an antibody comprising the heavy chain variable region of the antibody of the above (1) and the light chain variable region of the antibody of the above (2).
4. The antibody according to any one of items 1-3, characterized in that the heavy chain variable region of the antibody comprises: CDR-H1 represented by SEQ ID NO: 1, CDR-H2 represented by SEQ ID NO: 3, and CDR-H3 represented by SEQ ID NO: 5.
5. The antibody according to any one of items 1-3, characterized in that the heavy chain variable region of the antibody comprises: CDR-H1 represented by SEQ ID NO: 2, CDR-H2 represented by SEQ ID NO: 4, and CDR-H3 represented by SEQ ID NO: 6.
6. The antibody according to any one of items 1-3, characterized in that the light chain variable region of the antibody comprises: CDR-L1 represented by SEQ ID NO: 7, CDR-L2 represented by SEQ ID NO: 9, and CDR-L3 represented by SEQ ID NO: 11.
7. The antibody according to any one of items 1-3, characterized in that the light chain variable region of the antibody comprises: CDR-L1 represented by SEQ ID NO: 8, CDR-L2 represented by SEQ ID NO: 10, and CDR-L3 represented by SEQ ID NO: 12.
8. The antibody according to any one of items 1-3, characterized in that the light chain variable region of the antibody has the sequence represented by SEQ ID NO: 13 or 14, or has a sequence with at least 80%, for example, 85%, 90%, 91%, 92%, 93%, 94%, 95%, 96%, 97%, 98%, 99% similarity to any one of the above sequences.
9. The antibody according to any one of items 1-3, characterized in that the heavy chain variable region of the antibody has the sequence represented by SEQ ID NO: 15 or 16, or has a sequence with at least 80%, for example, 85%, 90%, 91%, 92%, 93%, 94%, 95%, 96%, 97%, 98%, 99% similarity to any one of the above sequences.
10. A monoclonal antibody targeting B cell maturation antigen (BCMA), characterized in that the antibody recognizes the same epitope as the antibody according to any one of items 1-9.
11. A monoclonal antibody targeting B cell maturation antigen (BCMA), characterized in that the antibody competitively binds to B cell maturation antigen (BCMA) with the antibody according to any one of items 1-9.
12. A nucleic acid encoding the antibody according to any one of items 1-11.
13. An expression vector comprising the nucleic acid according to item 12.
14. A host cell comprising the expression vector according to item 13 or a genome integrated with the nucleic acid according to item 12.
15. A method for producing a monoclonal antibody, comprising culturing the host cell according to item 14 to produce the monoclonal antibody according to any one according to items 1 to 11.
16. A pharmaceutical composition comprising the monoclonal antibody according to any one of items 1 to 11 and a pharmaceutically acceptable carrier.
17. A kit or product comprising the monoclonal antibody according to any one of items 1 to 11 or the pharmaceutical composition according to item 16.
18. A method for treating a disease related to the expression of BCMA, comprising: administrating the monoclonal antibody according to any one of items 1 to 11 or the pharmaceutical composition according to item 16 or the kit or product according to item 17 to a subject in need thereof
19. The method according to item 18, wherein the disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome.
20. The method according to item 18 or 19, wherein the disease is multiple myeloma.
21. Use of the monoclonal antibody according to any one of items 1 to 11 in the preparation of a medicament for treating a disease related to the expression of BCMA.
22. The use according to item 21, wherein the disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome.
23. The use according to item 21 or 22, wherein the disease is multiple myeloma.

Effect of the Present Invention

Compared with the Belantamab mafodotin antibody (abbreviated as GSK2857916), the antibody according to the present invention can bind to both human BCMA and monkey BCMA, it is close to or even better than the Belantamab mafodotin antibody in terms of affinity. The antibody according to the present invention is close to or even better than GSK2857916 in terms of the effect of blocking BCMA from binding its ligand BAFF or APRIL. In terms of the endocytosis effect, the antibody according to the present invention has a better endocytosis effect than GSK2857916. In terms of thermal stability, the antibody according to the present invention has better thermal stability than GSK2857916. In terms of immunogenicity, the antibody according to the present invention is a humanized antibody with lower immunogenicity.

BRIEF DESCRIPTION OF THE DRAWINGS

FIG. 2 (A) shows the binding results of human and monkey BCMA antigens with different tags (Fc and His) and the positive control antibody GSK2857916.

FIG. 3 shows the binding assay of the candidate antibody to cells overexpressing human or monkey BCMA, and the results show that the candidate antibody has the property of human-monkey cross-reactivity.

FIG. 4 shows the detection results of the affinity of the cross-reactivity of some candidate antibodies with human BCMA and monkey BCMA.

FIG. 5 shows the detection results of the blocking effect of some candidate antibodies.

FIGS. 6 (A) and (B) show the endocytosis effect of some candidate antibodies on the human myeloma cell line H929 cells, the results show that some candidate antibodies have better endocytosis effects than the antibody GSK2857916.

FIG. 7 shows a summary of the functions of the candidate antibodies. FIG. 7 shows the affinity effects of some candidate antibodies on HEK293 cells expressing human BCMA, the affinity effects on CHO cells expressing monkey BCMA, the affinity effects with human BCMA and monkey BCMA at the Elisa level, the effect of blocking the binding of BAFF to BCMA at the Elisa level, the effect of blocking the binding of APRIL to BCMA at the Elisa level, and the endocytosis effect of the antibody on the human myeloma cell H929; wherein the number of '+' from more to less means that the affinity, blocking and endocytosis effects of the antibody are from strong to weak. The results show that, the antibodies SY14-3rd-5-6-7 and SY14-3rd-5-6-32 show a more excellent comprehensive effect.

FIG. 8 (A) shows the detection of the affinity effect of antibody SY14-3rd-5-6-7 (also known as 5-6-7 or 5-6-7-WT) binding to human BCMA at the Elisa level before and after humanization, the results show that the affinity of the antibody binding to human BCMA after humanization is consistent with that before humanization.

FIG. 9 shows the detection results of the affinity of the cross-reactivity of the humanized antibody (5-6-32-hu-2) with human BCMA and monkey BCMA.

FIG. 10 shows the detection results of the blocking effect of the antibody (5-6-7-hu-2) after humanization.

FIG. 11 shows the detection results of the blocking effect of the antibody (5-6-32-hu-2) after humanization.

FIG. 12 (C) shows the detection of the binding ability of the antibodies 5-6-7 and 5-6-32 to the myeloma cell line H929 cells before and after humanization, the results show that the binding ability of the antibodies to the myeloma cell line H929 cells after humanization is consistent with that before humanization, and is better than that of the antibody GSK2857916.

FIG. 13 shows the detection results of the endocytosis effect of antibodies on H929 cells before and after humanization.

FIG. 14 shows the summary results of each function of the humanized antibody. FIG. 14 shows the degree of humanization of the humanized antibody, the affinity effect of the humanized antibody on HEK293 cells expressing human BCMA, and the affinity effect of the humanized antibody on CHO cells expressing monkey BCMA, the affinity effect of the humanized antibody binding to human BCMA and monkey BCMA at the Elisa level, the effect of the humanized antibody to block the binding of BAFF to BCMA, the effect of the humanized antibody to block the binding of APRIL to BCMA, and the endocytosis effect of antibody on human myeloma cell H929; wherein the number of '+' from more to less means that the affinity, blocking and endocytosis effects of the antibody are from strong to weak. The results show that, the functions of the antibody after humanization are consistent with that before humanization, and some of the functions of the humanized antibody are close to or better than those of the antibody GSK2857916.

SPECIFIC EMBODIMENTS

Figure 1:
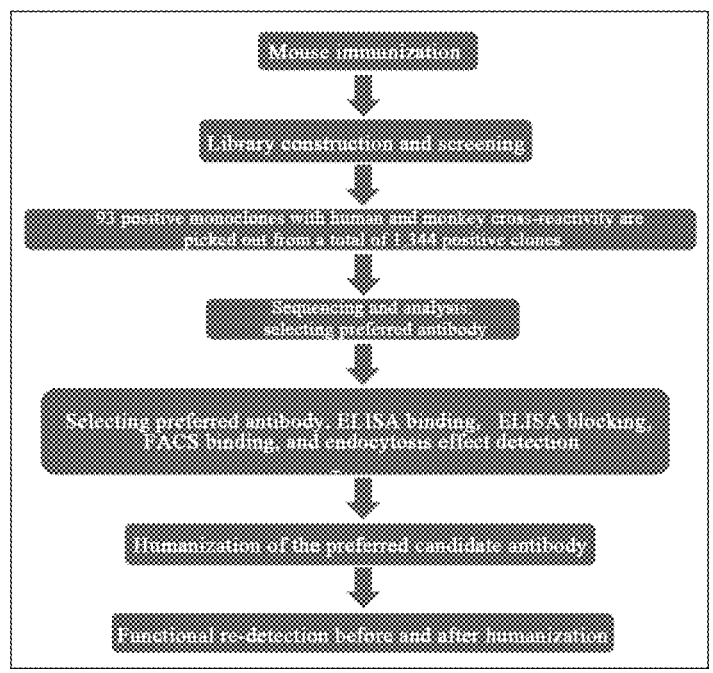
FIG. 1 shows the process of antibody production, illustrating the production process of the antibody targeting BCMA and having human-monkey cross-reactivity.

In order to make the objectives, technical solutions, and advantages of the present invention clearer, the present invention will be further described in detail below in conjunction with specific embodiments and with reference to the accompanying drawings.

The scientific and technological terms mentioned in this specification have the same meaning as those commonly understood by those skilled in the art. In case of conflict, the definition in this specification shall control.

Generally speaking, the terms used in this specification have the following meanings.

In this specification, an "isolated" antibody is an antibody that has been separated from a component of its natural environment. In some embodiments, the antibody is purified to a purity greater than 95% or 99%, and the purity is determined by, for example, electrophoresis (e.g., SDS-PAGE isoelectric focusing (IEF), capillary electrophoresis) or chromatography (e.g., ion exchange or reverse phase HPLC).

The term "BCMA" herein is also a B cell maturation antigen, also known as CD269, a member of the tumor necrosis factor receptor superfamily, namely TNFRSF17 (Thompson et al., J. Exp. Medicine, 192(1):129-135, 2000). Human BCMA is almost exclusively expressed in plasma cells and multiple myeloma cells (see, for example, Novak et al., Blood, 103(2):689-694, 2004; Neri et al., Clinical Cancer Research, 73(19): 5903-5909; Felix et al., Mol. Oncology, 9(7):1348-58, 2015). BCMA can bind B cell activating factor (BAFF) and proliferation-inducing ligand (APRIL) (for example, Mackay et al., 2003 and Kalled et al., Immunological Review, 204:43-54, 2005). BCMA may be a suitable tumor antigen target for immunotherapeutics for multiple myeloma.

"Antigen (Ag)" refers to a compound, composition, or substance that can stimulate antibody production or T cell response in an animal, and includes a composition injected or absorbed into an animal (for example, a composition including a cancer-specific protein). The antigen reacts with products of specific humoral or cellular immunity, including products induced by heterologous antigens (such as the disclosed antigens). In a specific embodiment, the target antigen is an epitope of a BCMA polypeptide.

"Epitope" or "antigenic determinant" refers to the region of an antigen that is bound by a binding agent. Epitopes can be formed by contiguous amino acids or discrete amino acids joined by tertiary folding of the protein. Epitopes formed by consecutive amino acids usually remain when exposed to a denaturing solvent, while epitopes formed by tertiary folding usually disappear when treated with a denaturing solvent. Epitopes usually include at least 3, and more usually at least 5, about 9, or about 8-10 amino acids in a unique spatial conformation.

Antibodies include their antigen-binding fragments, such as camel Ig, Ig NAR, Fab fragments, Fab' fragments, F(ab)'2 fragments, F(ab)'3 fragments, Fv, single-chain Fv proteins ("scFv"), double-scFv, (scFv)2, mini-antibodies, bifunctional antibodies, tri-functional antibodies, tetra-functional antibodies, disulfide stabilized Fv proteins ("dsFv") and single domain antibodies (sdAbs, nanobodies) and part of a full-length antibody responsible for antigen binding. The term also includes genetically engineered forms, such as chimeric antibodies (e.g., humanized murine antibodies), hybrid antibodies (e.g., bispecific antibodies), and antigen-binding fragments thereof. See also Pierce Catalog and Handbook, 1994-1995 (Pierce Chemical Co., Rockford, Illinois (IL)); Kuby, Journal of Immunology, 3rd edition, W.H. Freeman & Co., New York, 1997.

As understood by the skilled person and as described elsewhere herein, a complete antibody comprises two heavy chains and two light chains. Each heavy chain is composed of a variable region and first, second, and third constant regions, and each light chain is composed of a variable region and a constant region. Mammalian heavy chains are classified into α, δ, ε, γ, and μ. Mammalian light chains are classified as λ or κ. Immunoglobulins comprising α, δ, ε, γ, and μ heavy chains are classified into immunoglobulin (Ig) A, IgD, IgE, IgG and IgM. The complete antibody forms a "Y" shape. The stem of Y is composed of the second and third constant regions of the two heavy chains (and for IgE and IgM, the fourth constant region) which are joined together, and disulfide bonds (interchains) are formed in the hinge. The heavy chains γ, α, and δ have a constant region composed of three tandem (in a row) Ig domains, and a hinge region for increasing flexibility; the heavy chains μ and ε have a constant region composed of four immunoglobulin domains. The second and third constant regions are called "CH2 domain" and "CH3 domain", respectively. Each arm of Y comprises a variable region and a first constant region of a single heavy chain that are bound to the variable and constant regions of a single light chain. The variable regions of the light and heavy chains are responsible for antigen binding.

The light and heavy chain variable regions comprise "framework" regions interspersed with three hypervariable regions (also called "complementarity determining regions" or "CDRs"). CDR can be defined or identified by conventional methods, for example according to the sequence of Kabat et al. (Wu, TT and Kabat, EA, Journal of Experimental Medicine 132(2):211-50, (1970); Borden, P. and Kabat EA, PNAS, 84: 2440-2443 (1987); see Kabat et al., Sequences of Proteins of Immunological Interest, U.S. Department of Health and Human Services, 1991, which is incorporated herein by reference), or according to the structure of Chothia et al. (Choithia, C. and Lesk, A M, J Mol. Biol.), 196(4): 901-917 (1987); Choithia, C. et al., Nature, 342:877-883 (1989)).

The sequences of the framework regions of different light chains or heavy chains have relative conservativeness in species (such as humans). The framework region of an antibody (which is the combined framework region of the light chain and the heavy chain) is used to locate and align the CDRs in a three-dimensional space. CDR is mainly responsible for binding to the epitope of the antigen. The CDRs of each chain are usually called CDR1, CDR2, and CDR3, numbered sequentially from the N-terminus, and are usually identified by the chain in which the specific CDR is located. Therefore, the CDRs located in the variable domain of the heavy chain of an antibody are called CDR-H1, CDR-H2 and CDR-H3, and the CDRs located in the variable domain of the light chain of an antibody are called CDR-L1, CDR-L2 and CDR-L3. Antibodies with different specificities (i.e., different combination sites for different antigens)

have different CDRs. Although the CDRs are different between antibodies, only a limited number of amino acid positions within the CDRs are directly involved in antigen binding. These positions within the CDR are called specificity determining residues (SDR). Illustrative examples of light chain CDRs suitable for construction of the humanized BCMA CARs encompassed herein include, but are not limited to, the CDR sequences set forth in SEQ ID NOs: 1-3. Illustrative examples of heavy chain CDRs suitable for construction of the humanized BCMA CARs encompassed herein include, but are not limited to, the CDR sequences set forth in SEQ ID NOs: 4-6.

Reference to "$V_H$" or "VH" refers to the variable region of an immunoglobulin heavy chain, including the heavy chain variable region of an antibody, Fv, scFv, dsFv, Fab, or other antibody fragments as disclosed herein. Reference to "$V_L$" or "VL" refers to the variable region of an immunoglobulin light chain, including the light chain variable region of an antibody, Fv, scFv, dsFv, Fab, or other antibody fragments as disclosed herein.

A "monoclonal antibody" is an antibody produced by a single clone of B lymphocytes or by cells in which the light chain and heavy chain genes of a single antibody have been transfected. Monoclonal antibodies are produced by methods known to those skilled in the art, for example, by preparing a hybrid antibody-forming cell from a fusion of myeloma cell and immune spleen cell. Monoclonal antibodies include humanized monoclonal antibodies.

"Fv" is the smallest antibody fragment that comprises a complete antigen binding site. In one embodiment, the double-chain Fv category is composed of a dimer of a heavy chain variable domain and a light chain variable domain in a tight non-covalent association manner. In the single-chain Fv (scFv) category, a heavy-chain variable domain and a light-chain variable domain can be covalently linked through a flexible peptide linker, so that the light chain and the heavy chain can be associated in a "dimeric" structure manner similar to the double-chain Fv category. In this configuration, the three hypervariable regions (HVRs) of each variable domain interact to define the antigen binding site on the surface of the VH-VL dimer. The six HVRs collectively confer antigen-binding specificity to the antibody. However, even a single variable domain (or half of the Fv that comprises only three HVRs specific to the antigen) has the ability to recognize and bind to the antigen, but the affinity is lower than the complete binding site.

The Fab fragment comprises the variable domain of the heavy chain and the variable domain of the light chain, and also comprises the constant domain of the light chain and the first constant domain (CH1) of the heavy chain. The difference between Fab' fragment and Fab fragment is that, several residues are added to the carboxyl end of the CH1 domain of the heavy chain, including one or more cysteines from the hinge region of an antibody. Fab'-SH is the name for Fab' herein, in which the cysteine residue of the constant domain carries a free thiol group. F(ab')2 antibody fragments are originally produced as pairs of Fab' fragments with hinge cysteines therebetween. Other chemical couplings of antibody fragments are also known.

As mentioned above, the present invention relates to an isolated monoclonal antibody targeting B cell maturation antigen (BCMA), wherein the antibody can bind to both human BCMA and monkey BCMA. Particularly in the present invention, the affinity effect of the antibody according to the present invention on cells expressing human BCMA and monkey BCMA is verified by flow cytometer operation method (FACS method). The affinity effect of the monoclonal antibody obtained in the present invention for human BCMA-HEK293 cells is better than that of the positive control antibody (GSK2857916). The affinity effect of the monoclonal antibody obtained in the present invention for monkey BCMA-CHO cells is close to or better than that of the positive control antibody (GSK2857916). The monoclonal antibody obtained by the present invention can simultaneously bind to the human BCMA and monkey BCMA with high affinity; and the binding of the antibody to the BCMA of monkey is convenient for using monkey (cynomolgus monkey) as a model to carry out toxicological evaluation and pharmacokinetic evaluation before entering clinical research. At the same time, the monoclonal antibody according to the present invention has a high affinity, and the high-affinity antibody has more advantages in pharmacodynamics. For example, the antibody dissociates more slowly after binding to the target antigen molecule, which makes the antibody endocytosis more effective on a cell, and to achieve the same cell or animal efficacy, the required antibody dose may also be lower.

As used herein, the terms "specific binding", "specific recognition" or "specific for . . . " refer to a measurable and reproducible interaction, such as the binding between a target and an antigen binding protein. For example, an antigen binding protein specifically binding to a target (which can be an epitope) is an antigen binding protein that binds to the target with greater affinity, avidity, easier, and/or longer duration as compared with the binding to other targets. In some embodiments, the degree of binding of the antigen binding protein to the unrelated target is about 10% less than that of the binding of the antigen binding protein to the target, for example, as determined by radioimmunoassay (RIA). In some embodiments, the antigen binding protein specifically binding to the target has a dissociation constant (Kd)≤1 µM, ≤100 nM, ≤10 nM, ≤1 nM, or ≤0.1 nM.

Particularly, the antibody according to the present invention comprises a heavy chain variable region comprising: the heavy chain complementarity determining region 1 (CDR-H1) represented by SEQ ID NO: 1 (GHIFTNFHFH) or SEQ ID NO: 2 (GYIFTNYHMH), and/or the heavy chain complementarity determining region 2 (CDR-H2) represented by SEQ ID NO: 3 (GIYPGNGDTF) or SEQ ID NO: 4 (GIYPGNGDIF), and/or the heavy chain complementarity determining region 3 (CDR-H3) represented by SEQ ID NO: 5 (GSYYGYIDAMDY) or SEQ ID NO: 6 (GSYYGYIDAMDY).

Particularly, the antibody according to the present invention may comprise a light chain variable region comprising: the light chain complementarity determining region 1 (CDR-L1) represented by SEQ ID NO: 7 (RASQDISNYLN) or SEQ ID NO: 8 (RASQDISNDLN), and/or the light chain complementarity determining region 2 (CDR-L2) represented by SEQ ID NO: 9 (YTSRLHS) or SEQ ID NO: 10 (YTSRLPS), and/or the light chain complementarity determining region 3 (CDR-L3) represented by SEQ ID NO: 11 (QQGNTLPWT) or SEQ ID NO: 12 (QQGHTLPWT).

Particularly, the antibody according to the present invention may comprise a heavy chain variable region and a light chain variable region, wherein the heavy chain variable region comprises: the heavy chain complementarity determining region 1 (CDR-H1) represented by SEQ ID NO: 1 or 2, and/or the heavy chain complementarity determining region 2 (CDR-H2) represented by SEQ ID NO: 3 or 4, and/or the heavy chain complementarity determining region 3 (CDR-H3) represented by SEQ ID NO: 5 or 6; and the light chain variable region comprises: the light chain complementarity determining region 1 (CDR-L1) represented by SEQ ID NO: 7 or 8, and/or the light chain complementarity determining region 2 (CDR-L2) represented by SEQ ID NO: 9 or 10, and/or the light chain complementarity determining region 3 (CDR-L3) represented by SEQ ID NO: 11 or 12.

Particularly, the antibody according to the present invention comprises a light chain variable region comprising the amino acid sequence represented by

```
SEQ ID NO: 13:
DIQMTQSPSSLSASVGDRVTITCRASQDISNYLNWYQQKPGKAVKLLIY

YTSRLHSGVPSRFSGSGSGTDFTLTISSLQPEDIATYYCQQGNTLPWTF

GQGTKLEIK;
or

SEQ ID NO: 14:
DIQMTQSPSSLSASVGDRVTITCRASQDISNDLNWYQQKPGKAPKLLIY

YTSRLPSGVPSRFSGSGSGTDFTLTISSLQPEDIATYYCQQGHTLPWTF

GQGTKLEIK;
``` or a variant of the above sequence.

Particularly, the antibody according to the present invention comprises a heavy chain variable region comprising the amino acid sequence represented by

```
SEQ ID NO: 15:
QVQLVQSGAEVKKPGSSVKISCKASGHIFTNFHFHWVRQAPGQGLEWIG

GIYPGNGDTFYNQKFQGRATITADKSTSTAYMELSSLRSEDTAVYYCVR

GSYYGYIDAMDYWGQGTSVTVSS;
or

SEQ ID NO: 16:
QVQLVQSGAEVKKPGSSVKISCKASGHIFTNFHFHWVRQAPGQGLEWIG

GIYPGNGDTFYNQKFQGRATITADKSTSTAYMELSSLRSEDTAVYYCVR

GSYYGYIDAMDYWGQGTSVTVSS;
``` or a variant of the above sequence.

Particularly, the antibody according to the present invention comprises a light chain variable region and a heavy chain variable region, wherein the light chain variable region comprises the amino acid sequence represented by SEQ ID NO: 13 or 14, or a variant of the above sequence; the heavy chain variable region comprises the amino acid sequence represented by SEQ ID NO: 15 or 16, or a variant of the above sequence.

Particularly, the heavy chain variable region of an antibody according to the present invention comprises: CDR-H1 represented by SEQ ID NO: 1, CDR-H2 represented by SEQ ID NO: 3, and CDR-H3 represented by SEQ ID NO: 5. The heavy chain variable region of another antibody according to the present invention comprises: CDR-H1 represented by SEQ ID NO: 2, CDR-H2 represented by SEQ ID NO: 4, and CDR-H3 represented by SEQ ID NO: 6.

Particularly, the light chain variable region of an antibody according to the present invention comprises: CDR-L1 represented by SEQ ID NO: 7, CDR-L2 represented by SEQ ID NO: 9, and CDR-L3 represented by SEQ ID NO: 11. The light chain variable region of another antibody according to the present invention comprises: CDR-L1 represented by SEQ ID NO: 8, CDR-L2 represented by SEQ ID NO: 10, and CDR-L3 represented by SEQ ID NO: 12.

Particularly, the light chain variable region of the antibody according to the present invention has a sequence represented by SEQ ID NO: 13 or 14, or has the sequence with at least 80%, for example, 85%, 90%, 91%, 92%, 93%, 94%, 95%, 96%, 97%, 98%, 99% similarity to any of the above sequences. Particularly, the heavy chain variable region of the antibody according to the present invention has the sequence represented by SEQ ID NO: 15 or 16, or has a sequence with at least 80%, for example, 85%, 90%, 91%, 92%, 93%, 94%, 95%, 96%, 97%, 98%, 99% similarity to any of the above sequences.

Particularly, an antibody according to the present invention comprises a heavy chain variable region and a light chain variable region, wherein the heavy chain variable region comprises: CDR-H1 represented by SEQ ID NO: 1, CDR-H2 represented by SEQ ID NO: 3, and CDR-H3 represented by SEQ ID NO: 5; the light chain variable region comprises: CDR-L1 represented by SEQ ID NO: 7, CDR-L2 represented by SEQ ID NO: 9, and CDR-L3 represented by SEQ ID NO: 11. Particularly, the light chain variable region of the antibody has the sequence represented by SEQ ID NO: 13, or has the sequence with at least 80%, for example, 85%, 90%, 91%, 92%, 93%, 94%, 95%, 96%, 97%, 98%, 99% similarity to any of the above sequence; the heavy chain variable region of the antibody has the sequence represented by SEQ ID NO: 15, or has the sequence with at least 80%, for example, 85%, 90%, 91%, 92%, 93%, 94%, 95%, 96%, 97%, 98%, 99% similarity to any of the above sequence.

Particularly, another antibody according to the present invention comprises a heavy chain variable region and a light chain variable region, wherein the heavy chain variable region comprises: CDR-H1 represented by SEQ ID NO: 2, CDR-H2 represented by SEQ ID NO: 4, and CDR-H3 represented by SEQ ID NO: 6; the light chain variable region comprises: CDR-L1 represented by SEQ ID NO: 8, CDR-L2 represented by SEQ ID NO: 10, and CDR-L3 represented by SEQ ID NO: 12. Particularly, the light chain variable region of the antibody has the sequence represented by SEQ ID NO: 14, or has the sequence with at least 80%, for example, 85%, 90%, 91%, 92%, 93%, 94%, 95%, 96%, 97%, 98%, 99% similarity to any of the above sequence; the heavy chain variable region of the antibody has the sequence represented by SEQ ID NO: 16, or has the sequence with at least 80%, for example, 85%, 90%, 91%, 92%, 93%, 94%, 95%, 96%, 97%, 98%, 99% similarity to any of the above sequence.

As used herein, the term "variant" refers to a heavy chain variable region or a light chain variable region that has been modified with at least one, for example, 1, 2 or 3 amino acid substitutions, deletions or additions, wherein the modified antigen binding protein comprising heavy chain or light chain variants substantively retains the biological characteristics of the antigen binding protein before modification. In one embodiment, the antigen binding protein comprising the sequence of a variant heavy chain variable region or variant light chain variable region retains 60%, 70%, 80%, 90%, 100% of the biological characteristics of the antigen binding protein before modification. It should be understood that, each heavy chain variable region or light chain variable region may be modified alone or in combination with another heavy chain variable region or light chain variable region. The antigen binding protein of the present disclosure comprises a amino acid sequence of the heavy chain variable region that has 90%, 91%, 92%, 93%, 94%, 95%, 96%, 97%, 98%, or 99% homology to the amino acid sequence of the heavy chain variable region described herein. The antigen binding protein of the present disclosure comprises a amino acid sequence of the light chain variable region that has 90%, 91%, 92%, 93%, 94%, 95%, 96%, 97%, 98%, or 99% homology to the amino acid sequence of the light chain variable region described herein. The percent homology may be in the entire heavy chain variable region and/or the entire light chain variable region, or the percent homology may be limited to the framework region, and the sequence corresponding to the CDR has 100% identity with the CDR(s) disclosed herein in the heavy chain variable region and/or the light chain variable region. As used herein, the term "CDR variant" refers to a CDR that has been modified with at least one, such as 1, 2 or 3 amino acid substitutions, deletions or additions, wherein the modified antigen binding protein comprising the CDR variant substantively retains the biological characteristics of antigen binding proteins before modification. In one embodiment, the antigen binding protein comprising a variant CDR retains 60%, 70%, 80%, 90%, 100% of the biological characteristics of the antigen binding protein before modification. It should be understood that, each CDR that may be modified alone or in combination with another CDR. In one embodiment, the modification is a substitution, especially a conservative substitution.

As mentioned above, the antibody according to the present invention has excellent endocytosis effect, which is better than that of the positive control antibody (GSK2857916). Endocytosis, also known as pinocytosis or phagocytosis, is the process of transporting extracellular material into a cell through the deformation of the plasma membrane. According to the different size of the material entering a cell and difference of the mechanism entering the cell, endocytosis can be divided into three types: phagocytosis, pinocytosis, and receptor-mediated endocytosis. The endocytosis of the antibody according to the present invention refers to receptor-mediated endocytosis. After the binding of the BCMA-targeted monoclonal antibody to BCMA, the BCMA-antibody complex is mediated to form endosomes and fuse with lysosomes; in the lysosome, the BCMA-antibody complex is degraded by the lysosome, and part of the BCMA or BCMA-antibody complex may also be transported back to the cell membrane. When the monoclonal antibody according to the present invention is coupled to small toxin molecules to form ADC drugs, they are transported into the cell through endocytosis, and the released toxin molecules can kill target cells (such as multiple myeloma cells). Therefore, when the monoclonal antibody according to the present invention is developed as an ADC drug, the better endocytosis effect is very critical to help mediate the drug into target cells.

In addition, the antibody according to the present invention is a humanized antibody. The binding activities of the antibody to human BCMA and monkey BCMA before and after the humanization of the present invention are substantively the same, and the effects of the antibody to block the binding of BCMA to BAFF before and after the humanization modification are substantively the same. The effects of the binding of the antibody to monkey BCMA-CHO cells before and after the humanization modification of the present invention are substantively the same, and both are better than that of the positive control antibody (GSK2857916), and the effects of the binding of the antibody to H929 cells before and after the humanization are substantively the same, and both are better than that of the positive control antibody (GSK2857916). Moreover, the endocytosis effects of the antibody on the human myeloma cell line H929 cells before and after the humanization modification are substantively the same, and both are better than that of the positive control antibody (GSK2857916).

"Humanized antibody" refers to a type of engineered antibody whose CDRs derived from the immunoglobulin of a non-human donor, and the remaining immunoglobulin-derived portion of the molecule is derived from one or more human immunoglobulins. In addition, framework support residues can be changed to retain binding affinity (see, for example, Queen et al., Proc. Natl Acad Sci USA, 86: 10029-10032 (1989), Hodgson et al., Bio/Technology, 9: 421 (1991)). Suitable human acceptor antibodies may be antibodies selected from conventional databases such as databases, Los Alamos database, and Swiss protein database by homology with the nucleotide and amino acid sequences of the donor antibody. Human antibodies characterized by homology (based on amino acids) to the framework regions of the donor antibody may be suitable for providing heavy chain constant regions and/or heavy chain variable framework regions for insertion of the donor CDR. A suitable acceptor antibody capable of providing constant or variable framework regions of the light chain can be selected in a similar manner. It should be noted that, the heavy chain and light chain of the acceptor antibody need not be derived from the same acceptor antibody.

The thermal stability of the humanized antibody according to the present invention is slightly better than that of the positive control antibody (GSK2857916), and meets the condition of thermal stability of antibody drug medicine. Poor thermal stability may lead to antibody druggability problems, such as low expression of the antibody and aggregation of the antibody.

In addition, the present invention also relates to a monoclonal antibody targeting B cell maturation antigen (BCMA), which recognizes the same epitope as the above antibody according to the present invention. The present invention also relates to a monoclonal antibody targeting B cell maturation antigen (BCMA), which competitively binds to B cell maturation antigen (BCMA) with the above antibody according to the present invention.

Particularly, the present invention also relates to a nucleic acid encoding the above antibody according to the present invention. The present invention also relates to an expression vector comprising the above nucleic acid according to the present invention. The present invention also relates to a host cell comprising the above expression vector according to the present invention or a genome integrated with the nucleic acid according to the present invention.

As known in the art, "polynucleotide" or "nucleic acid" used interchangeably herein refers to a chain of nucleotides of any length, and comprises DNA and RNA. Nucleotides can be deoxyribonucleotides, ribonucleotides, modified nucleotides or bases, and/or analogs thereof, or any substrate capable of being incorporated into the chain by DNA or RNA polymerase. As used herein, "vector" refers to a construct capable of delivering one or more genes or sequences of interest into a host cell and preferably expressing said genes or sequences in the host cell. Examples of vectors include, but are not limited to: viral vectors, naked DNA or RNA expression vectors, plasmids, cosmids or phage vectors, DNA or RNA expression vectors related to cationic flocculants, DNA or RNA expression vectors encapsulated in liposomes, and certain eukaryotic cells, such as producer cells. In the present invention, the terms "host cell", "host cell line" and "host cell culture" are used interchangeably, and refer to cells into which exogenous nucleic acid has been introduced, including the progeny of these cells. Host cells include "transformants" and "transformed cells", which include primary transformed cells and progeny derived therefrom, regardless of the number of passages. The progeny may not be exactly the same as the parent cell in terms of nucleic acid content, but they may comprise mutations. The present disclosure includes mutant progeny that have the same function or biological activity as the cells screened or selected from the initially transformed cells.

The present invention also relates to a method for producing a monoclonal antibody, which comprises culturing the host cell of the present invention to produce the above monoclonal antibody according to the present invention.

The present invention also relates to a pharmaceutical composition, which comprises the monoclonal antibody according to the present invention and a pharmaceutically acceptable carrier. The present invention also relates to a kit or product, which comprises the monoclonal antibody according to the present invention or the pharmaceutical composition of the present invention. As used herein, "pharmaceutically acceptable carrier" or "pharmaceutically acceptable excipient" includes such a material that, when combined with an active ingredient, allows the ingredient to maintain biological activity, and does not react with the subject's immune system. Examples include, but are not limited to, any standard pharmaceutical carrier, for example, phosphate buffered saline solution, water, emulsion (such as oil/water emulsion), and various types of wetting agents. Preferred diluent for aerosol or parenteral administration is phosphate buffered saline (PBS) or physiological saline (0.9%). A composition comprising this type of carriers is formulated by a well-known conventional method (see, for example, Remington's Pharmaceutical Sciences, 18th edition, A. Gennaro, ed., Mack Publishing Co., Easton, P A, 1990; and Remington, The Science and Practice of Pharmacy 21st Ed. Mack Publishing, 2005).

The present invention also relates to a method for treating a disease related to the expression of BCMA, the method comprises: administering the monoclonal antibody according to the present invention or the pharmaceutical composition according to the present invention or the kit or product according to the present invention to a subject in need thereof. Particularly, the above disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome. Particularly, the above disease is multiple myeloma.

Particularly, the term "multiple myeloma (MM)", also known as plasma cell myeloma or Kahler's disease (after Otto Kahler), is a refractory clonal B cell tumor characterized by the accumulation of malignant plasma B cells in close contact with stromal cells in the bone marrow. MM is a progressive disease, especially caused by multiple genetic damages to precursor plasma B cells, i.e., mainly chromosomal translocations caused by translocations such as t(11; 14), t(4;14), t(8;14), or deletions such as del(13) and del(17), which makes tumor cells proliferate significantly and becomes apoptosis-tolerant. B lymphocytes start in the bone marrow and move to the lymph nodes. Due to their development, B lymphocytes mature on their cell surface and display different proteins. When they are activated to secrete antibodies, they are called plasma cells. After they leave the part of the lymph node called the germinal center, multiple myeloma develops in B cells. The immune system maintains the proliferation of B cells and the secretion of antibodies under strict control. When chromosomes and genes are damaged (usually through rearrangement), this control is lost. Normally, when the promoter gene moves (or translocates) to the chromosome, it stimulates the overproduction of antibody genes.

As mentioned above, chromosomal translocation between heavy chain genes (on chromosome 14, locus 14q32) and oncogenes (often 11q13, 4p16.3, 6p21, 16q23 and 20q11 [10]) of the immunoglobulin are frequently observed in patients with multiple myeloma. This mutation leads to the dysregulation of the oncogene, which is considered to be an important initial event in the pathogenesis of myeloma. The result is the proliferation of plasma cell clones and genomic instability, thereby leading to further mutations and translocations. Chromosome 14 abnormalities are observed in about 50% of all myeloma cases. The deletion of chromosome 13 (part of) is also observed in about 50% of cases.

Herein, "subject", "individual" or "object" is a mammal, more preferably a human. Mammals also include, but are not limited to: farm animals, race animals, pets, primates, horses, dogs, cats, mice, and rats. In the present invention, administering the monoclonal antibody according to the present invention or the pharmaceutical composition according to the present invention or the kit or product according to the present invention to a subject in need thereof means administering an effective amount of the pharmaceutical composition or the kit or product; as used in the present invention, the term "effective amount" refers to the amount of a drug or agent that elicits a biological or pharmaceutical response of a tissue, system, animal, or human being pursued by, for example, a researcher or clinician. In addition, the term "therapeutically effective amount" means an amount that causes an improved treatment, cure, prevention, or alleviation of a disease, disorder, or side effect, or reduces the rate of progression of the disease or condition, as compared to the corresponding subject who did not receive the amount; within its scope the term also includes an amount effective to enhance normal physiological functions.

The present invention also relates to use of the monoclonal antibody according to the present invention in the preparation of a medicament for treating a disease related to the expression of BCMA. Particularly, the above disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome. Particularly, the above disease is multiple myeloma. As used herein, the terms "cancer", "neoplasm" and "tumor" are used interchangeably, and are singular or plural, and refer to cells that have undergone malignant transformation or cell changes leading to abnormal or unregulated growth or hyperproliferation. Such changes or malignant transformation usually make such cells pathogenic to the host organism, so it is also intended to include precancerous or premalignant cells that become or may become pathogenic and require intervention or may benefit from intervention. Primary cancer cells (i.e., cells taken from a site nearby the malignant transformation locus) can be distinguished from non-cancer cells by well-established techniques, especially histological examinations. As used in the present invention, the definition of cancer cells includes not only primary cancer cells, but also any cells derived from cancer cell ancestors; these cells include metastatic cancer cells, and the in vitro cultures and cell lines derived from cancer cells. When referring to the type of a cancer that usually manifests as a solid tumor, "clinically detectable" tumors are those detectable on the basis of tumor mass; for example, operations such as CAT scan, MR imaging, X-ray, ultrasound, or palpation, and/or tumors detectable due to the expression of one or more cancer-specific antigens in samples available from the patient. In other words, the terms of the present invention include cells, neoplasms, cancers and tumors of any stage, including those clinicians call primary cancer, tumor, in situ growth, and late metastatic growth. The tumor may be a hematopoietic tumor, such as a blood cell tumor, which is a liquid tumor. Particular examples of clinical conditions based on such tumors include leukemia such as chronic myeloid leukemia or acute myeloid leukemia; myeloma such as multiple myeloma; lymphoma and the like.

As mentioned above, compared to Belantamab mafodotin antibody (abbreviated as GSK2857916), the antibody according to the present invention can bind to both human BCMA and monkey BCMA, it is close to or even better than the Belantamab mafodotin antibody in terms of affinity. The antibody according to the present invention is close to or better than GSK2857916 in the effect of blocking the binding of BCMA to its ligand BAFF or APRIL, and blocking the binding of BCMA to BAFF and APRIL inhibits the activation of intracellular signaling pathways (such as the NFκB signaling pathway) caused by ligand binding, thereby inhibiting the survival of plasma cells. In terms of endocytosis effect, the antibody according to the present invention has better endocytosis effect than GSK2857916. The endocytosis effect is the key function of antibody-drug conjugate (ADC) to mediate cell killing. Antibodies with better endocytosis effect have more advantages in the killing effect of ADC drugs. In terms of thermal stability, the antibody according to the present invention has better thermal stability than GSK2857916. Thermal stability is a key indicator of antibody druggability. Antibodies with better thermal stability may have more advantages in antibody expression and reduce the possibility of producing aggregates. In terms of immunogenicity, the antibody according to the present invention is a humanized antibody, which has a lower risk of immunogenicity. Immunogenicity may stimulate the immune response in the human body; on one hand, it produces antibodies and reduces the effect of antibody drugs; on the other hand, strong immunogenicity may bring greater risk of side effects of drugs. For humanized antibodies, the sequences outside the CDR region of the antibody are mutated to make them closer to the human antibody sequence, thereby reducing the risk of strong immunogenicity caused by the antibody.

EXAMPLES

Example 1

Preparation of Raw Materials

In this example, the BCMA antigen and its ligands are purchased from ACRO Biosystems. At the same time, the positive antibody GSK2857916 of GlaxoSmithKline (GSK) is prepared according to the U.S. Patent Application (US20140105915A). It is worth noting that, the prepared positive antibody is not coupled to the toxin molecule, but does not affect other possible functions.

1.1 Antigen Preparation

Figure 2A:
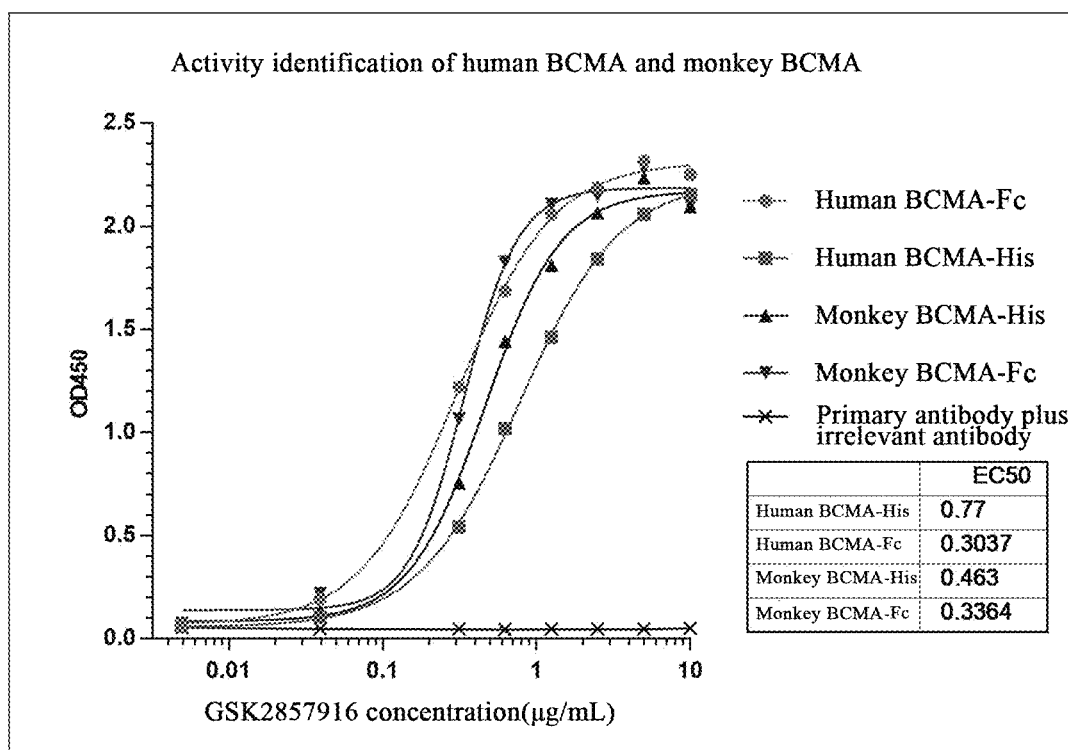
FIG. 2 shows the activity determination of recombinant proteins BCMA, BAFF and APRIL, and the results show that the activity of each protein is normal.
FIG. 2(B) shows the binding results of human BCMA antigen and different concentrations of BAFF coating the plate.
FIG. 2(C) shows the binding results of human BCMA antigen and different concentrations of APRIL coating the plate.

In this application, the following 4 types of antigens are used: human-BCMA-Fc, human-BCMA-His, cyno-BCMA-Fc and cyno-BCMA-His; all purchased from ACRO Biosystems, the catalog numbers are BC7-H5254, BCA-H522y, BCA-05253, and BCA-052H7, respectively. In addition, its activity has been mutually verified with GSK2857916, and is consistent with that disclosed in the US patent application US20140105915A. The result is shown in FIG. 2(A).

1.2 Preparation of the Ligand

Figure 2B:
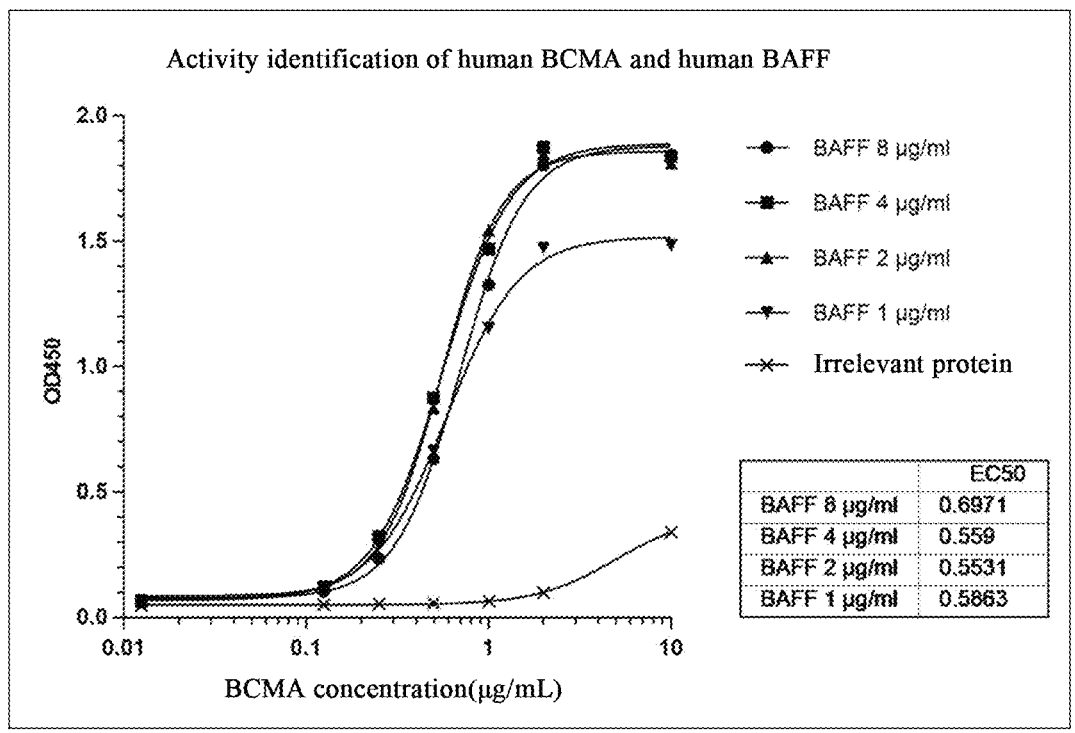
Figure 2C:
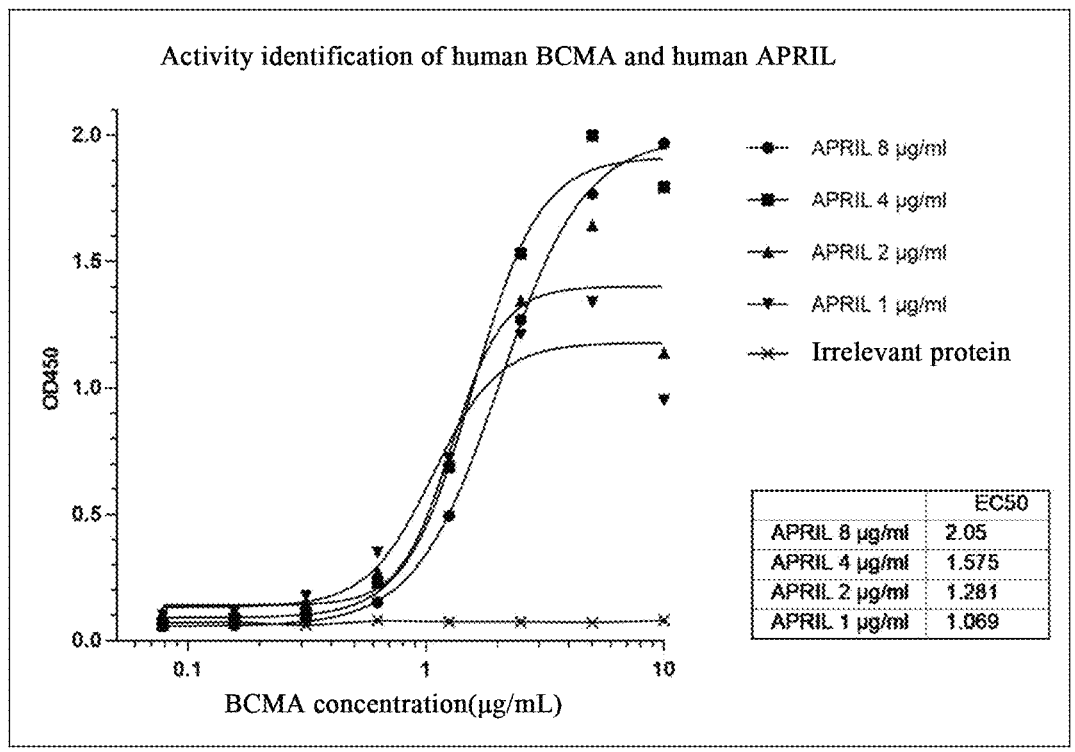

The following two kinds of ligands used in this application: human-BAFF-Fc and human-APRIL-Fc; both purchased from ACRO Biosystems, and the product numbers are BAF-H4268 and APL-H5267 respectively. In addition, its activity has been verified by binding with human-BCMA, and is consistent with that disclosed in US patent application US20140105915A. The results are shown in FIGS. 2(B) and 2(C).

1.3 Preparation of Positive Control Antibody

In this application, the positive control antibody GSK2857916 is expressed by using the ExpiCHO system, wherein the main materials used include: Gibco medium (Cat. No.: A29100-01), Gibco Transfection Kit (Cat. No.: A29129). Firstly, the light chain sequence of GSK2857916 (represented by the sequence of SEQ ID NO: 17) and the heavy chain sequence (represented by the sequence of SEQ ID NO.: 18) of GSK2857916 are synthesized according to the sequence disclosed in the US patent application US20140105915A, a plasmid comprising the light chain and heavy chain genes of the complete antibody GSK2857916 is constructed by molecular cloning. Mix the plasmid comprising the light chain of the antibody GSK2857916 and the plasmid comprising the heavy chain of the antibody GSK2857916 at a mass ratio of 2:1. In a 25 mL expression system, the above plasmid mixture (25 μg) is mixed with the transfection reagent according to the standard procedure, then adding dropwise into a 25 mL of ExpiCHO cell expression system; after mixing well, expressing in a cell culture incubator at 37° C. for 18-22 hours. Subsequently, feed medium is added to the above transfection mixture, then placing in a cell incubator at 32° C. to continue culturing; on day 5 after transfection, adding a second feed, and placing the cells in a cell incubator at 32° C. to continue culturing for 10-12 days. Then, the expressed cell suspension is centrifuged at a high speed, and the supernatant is taken. The obtained supernatant is filtered through a 0.22 μm filter membrane, and purified by the affinity method using a Protein A/G affinity chromatography column. After purification, the target proteins are eluted with 100 mM glycinate (pH 3.0), then concentrating, replacing, and aliquoting; and after identifying by SDS-PAGE and being qualified for activity, they are frozen for storage.

Example 2

Preparation of Cell Lines

In this example, the human myeloma cell line H929 cells expressing BCMA are purchased, and the cell line BCMA- HEK293 cells overexpressing human BCMA and the cell line BCMA-CHO cells overexpressing monkey BCMA are constructed.

2.1 Preparation of H929 Cell Line

In this application, H929 is purchased from Peking Union Medical College Cell Bank, Cat. No.: 3111C0001CCC000360, and it is a myeloma cell line that naturally and highly expresses human BCMA.

2.2 Preparation of BCMA-CHO Cell Line 2.2.1 Construction of a Plasmid Expressing the Full Length of Monkey BCMA A DNA fragment comprising the BCMA protein of cynomolgus monkey is synthesized by gene synthesis technology, and cloned into an expression vector. The expression vector is introduced into *Escherichia coli* by the method of chemical transformation, the single clone of *Escherichia coli* is picked to sequence to obtain the correct plasmid clone, and the plasmid is extracted and sequenced again for confirmation.

2.2.2 Electroporation

Gibco's CD-CHO serum-free medium (Cat. No.: 10743029) is used to culture CHO-s cells. The day before electroporation, the cells are passaged to $5 \times 10^6$/mL, and the next day the Invitrogen's electroporation kit (Cat. No.: MPK10096) and electroporator (Cat. No.: MP922947) are used to introduce the constructed plasmid into CHO-s cells. The electroporated cells are transferred to CD-CHO medium, then placing in a cell incubator 37° C. for 48 h.

2.2.3 Cell Plating after Electroporation

The electroporated CHO-s cells are spreaded into a 96-well plate at 2000 cells/well, adding MSX (Millipore, GSS-1015-F) at a final concentration of 30 μM and GS supplement (Sigma, 58672C-100 ml), and placing in a incubator at $CO_2$ at 37° C.; and a medium comprising 30 μM MSX and 1×GS supplement is added after 10 days.

2.2.4 Clone Picking, Cell Expansion and FACS Identification

The single-cell clones grown in 96-well plates are picked, and transferred to 24-well culture plates for continued expansion. After that, FACS is used to identify cell lines successfully transformed with monkey BCMA.

2.3 Preparation of BCMA-HEK293 Cell Line 2.3.1 Construction of a Plasmid Expressing the Full Length of Human BCMA A DNA fragment comprising human BCMA protein is synthesized by gene synthesis technology, and cloned into an expression vector. The expression vector is introduced into *Escherichia coli* by the method of chemical transformation, the single clone of *Escherichia coli* is picked to sequence to obtain the correct plasmid clone, and the plasmid is extracted and sequenced again for confirmation.

2.3.2 Electroporation

Gibco's DMEM serum-free medium (Cat. No. 12634010) is used to culture HEK293 cells. The day before the electroporation, the cells are passaged to $2 \times 10^5$/mL, and the next day the Invitrogen electroporation kit (Cat. No.: MPK10096) and electroporator (Cat. No.: MP922947) are used to introduce the constructed plasmid into HEK293 cells. The electroporated cells are transferred to DMEM medium, then placing in a cell incubator at 37° C. for 48 h.

2.3.3 Cell Plating after Electroporation

The electroporated HEK293 cells are spreaded into a 96-well plate at 1000 cells/well, adding puromycin at a final concentration of 2 μg/mL, and placing in a incubator at $CO_2$ at 37° C.; and 2 μg/mL puromycin medium is added 14 days later.

2.3.4 Clone Picking, Cell Expansion and FACS Identification

The single-cell clones grown in 96-well plates are picked, and transferred to 24-well culture plates for continued expansion. After that, FACS is used to identify cell lines successfully transformed with human BCMA.

Example 3

Animal Immunization

In this example, animal immunization includes several protocols and is carried out at the same time. During the immunization process, mouse serum is taken for titer detection, and the effect of immunization is evaluated, finally the number of the mouse to be used for building the library is determined based on the serum titer.

3.1 Animal Immunization 3.1.1. First Immunization Protocol

Babl/c mice (Shanghai Lingchang Biotechnology Co., Ltd., female, 6-8 weeks, n=2) are immunized by subcutaneous injection and intraperitoneal injection by cross-immunization, the materials include the aforementioned human BCMA-Fc and monkey BCMA-Fc antigen proteins (ACRO Biosystems). The first immunization dose is 100 μg/mouse, supplemented with CFA (Complete Freund's Adjuvant), and then the immunization dose is reduced to 50 μg/mouse, supplemented with IFA (Freund's Incomplete Adjuvant), both of which are cross-immunized for two weeks. The corresponding mouse numbers are Mouse 1 and Mouse 2.

3.1.2 Second Immunization Protocol

Babl/c mice (the mice are in the same batch as Protocol 1, n=2) are immunized by subcutaneous injection and intraperitoneal injection by cross-immunization, the materials include the aforementioned human BCMA-Fc and monkey BCMA-Fc antigen proteins (ACRO Biosystems), HEK293 cells with high expression of human BCMA, and CHO cells with high expression of monkey BCMA. The protein immunization dose is 20 μg/mouse, the cellular immunization dose is $1 \times 10^7$/mouse, and intraperitoneal injection is used to cross-immunize once a week. The corresponding mouse numbers are Mouse 3 and Mouse 4.

3.2 ELISA Assay for Serum Titer 3.2.1 Antigen Coating and Blocking

On the ELISA plate, human BCMA and monkey BCMA are respectively coated one day in advance at a coating concentration of 2 μg/mL, 30 μL/well, and overnight at 4° C. On the day of immunization titer determination, the plate is washed three times with PBST, blocking with 5% skimmed milk at room temperature for two hours, then washing three times with PBST.

3.2.2 Primary and Secondary Antibodies

Each serum sample is firstly diluted 500 times on the basis of the original solution, and then diluted in a 3-fold gradient, adding to the ELISA plate as the primary antibody to incubate for 1 h at room temperature; after washing the plate three times with PBST, the secondary antibody (Goat-anti-mouse-IgG-Fab-HRP, Sigma, M4115) is added to incubate at room temperature for 1 h.

3.2.3 Color Development, Termination and Plate Reading

After the incubation, the plate is washed six times with PBST, TMB (SurModics, TMBS-1000-01) is added to develop color, and 2M HCl is added to stop the reaction according to the color development result. The plate is read at OD450 with a microplate reader (Molecular Devices, SpecterMax 190). The serum titer results show that, the immunized mice have high titer to human BCMA and monkey BCMA, which may be used for the next step of antibody library construction. The results are shown in Tables 1-1 and 1-2 below.

TABLE 1-1

Detection of the titer of mouse serum by human BCMA
Detection of the titer of Serum and human BCMA

| Mouse number/ Dilution ratio | Titer after 4th immun. of Proto. 1 | | Titer after 5th immun. of Proto. 2 | | NC sera/ buffer | Positive control antibody GSK2857916 | Dilution concentration μ g/ml |
|---|---|---|---|---|---|---|---|
| | Mouse 1 | Mouse 2 | Mouse 3 | Mouse 4 | | | |
| 500 | 2.87 | 3.02 | 2.85 | 2.88 | 0.18 | 2.96 | 10.000 |
| 1500 | 2.88 | 2.86 | 2.74 | 2.17 | 0.10 | 2.96 | 3.333 |
| 4500 | 2.85 | 2.72 | 2.33 | 1.15 | 0.07 | 3.03 | 1.111 |
| 13500 | 2.56 | 2.01 | 1.22 | 0.55 | 0.06 | 3.00 | 0.370 |
| 40500 | 1.63 | 1.11 | 0.59 | 0.22 | 0.05 | 2.78 | 0.123 |
| 121599 | 0.33 | 0.53 | 0.22 | 0.10 | 0.05 | 2.13 | 0.041 |
| 364500 | 0.34 | 0.20 | 0.13 | 0.07 | 0.05 | 0.83 | 0.014 |
| 1093500 | 0.20 | D.14 | 0.13 | 0.08 | 0.06 | 0.25 | 0.005 |

Note:
immun. is the abbreviation of "immunization", and proto. is the abbreviation of "protocol".

TABLE 1-2

Detection of the titer of mouse serum by monkey BCMA
Detection of the titer of Serum and monkey BCMA

| Mouse number/ Dilution ratio | Titer after 4th immun. of Proto. 1 | | Titer after 5th immun. of Proto. 2 | | NC sera/ buffer | Positive control antibody GSK2857916 | Dilution concentration μ g/ml |
|---|---|---|---|---|---|---|---|
| | Mouse 1 | Mouse 2 | Mouse 3 | Mouse 4 | | | |
| 500 | 2.95 | 3.03 | 2.90 | 2.99 | 0.06 | 2.73 | 10.009 |
| 1500 | 2.91 | 3.01 | 2.66 | 2.52 | 0.05 | 2.73 | 3.333 |
| 4500 | 2.78 | 2.93 | 1.63 | 1.41 | 0.05 | 2.31 | 1.111 |
| 13500 | 2.53 | 2.20 | 0.72 | 0.57 | 0.05 | 2.83 | 0.370 |
| 40500 | 1.45 | 1.00 | 0.25 | 0.22 | 0.06 | 2.87 | 0.123 |
| 121500 | 0.66 | 0.43 | 0.12 | 0.11 | 0.05 | 2.53 | 0.041 |
| 364500 | 0.27 | 0.19 | 0.07 | 0.07 | 0.05 | 1.93 | 0.014 |
| 1093500 | 0.14 | 0.10 | 0.06 | 0.06 | 0.05 | 0.94 | 0.005 |

Note:
immun. is the abbreviation of "immunization", and proto. is the abbreviation of "protocol".

Example 4

In this example, the mice with the best titer in Example 3 are selected. Using phage display technology, the antibody gene of the B cell in the mouse spleen is cloned into a phage display vector to construct an antibody library. Using human BCMA and monkey BCMA as screening antigens, through processes including library screening, monoclonal preliminary screening and sequencing, 17 antibody molecules having binding activity to human and monkey BCMA antigens are finally obtained.

4.1 Construction of Gene Library of Phage Display Antibody

After the immunization, the mice are treated according to the standard procedure of euthanasia. The mouse spleen is taken out, after grinding and filtering, the spleen cells are collected, 1 mL of TRIzol™ Reagent (Thermo Fisher, 15596026) is added to lyse the spleen cells, extracting the total RNA by the phenol-chloroform method; and the extracted RNA is reverse transcribed into cDNA by reverse transcription kit (TaKaRa, 6210A). After that, using cDNA as a PCR template, specific primers amplified from murine antibody sequences are used to amplify the light chain and heavy chain genes of the antibody, respectively. Finally, through NcoI+NotI double enzyme digestion and T4 ligase ligation, the antibody gene fragments are inserted into the vector for phage display. The ligation product is recovered by the DNA recovery kit (Omega, D6492-02), finally transforming into competent E. coli SS320 (Lucigen, MC1061 F) by the electroporator (Bio-Rad, MicroPulser), and spreading on 2-YT (C+/K+2-YT) solid plates comprising ampicillin and tetracycline to amplify the SS320 strain of the correctly transformed antibody plasmid. Finally, a library comprising Fab antibody sequences is constructed.

4.2 Screening Gene Library of Phage Display Antibody
4.2.1 Screening Gene Library of Phage Display Antibody by Magnetic Bead Method Magnetic bead screening comprises the following processes: based on the combination of Biotin-labeled antigen protein and Avidin-coupled magnetic beads, the antigen-bound magnetic beads and library are subjected to the panning processes including incubation, washing and elution, after 2-4 rounds of panning, finally the monoclonal antibodies specific to the antigen are enriched. In this example, the principle is cross-panning by using Biotin-labeled human BCMA antigens and monkey BCMA antigens, wherein the human BCMA is used in the first and third rounds of panning, and the monkey BCMA is used in the second round of panning. A total of 3 rounds of panning are performed, and then the enriched antibody sequence mixture is subjected to a monoclonal preliminary screening of human BCMA and monkey BCMA.

The particular implementation method is as follows:
Firstly, Biotin-labeled human BCMA protein is incubated with Avidin-coupled magnetic beads, so that the human BCMA protein binds to the magnetic beads. The magnetic beads bound with BCMA antigen and the constructed phage library are incubated for 2 h at room temperature, after washing 6-8 times with PBST, removing the non-specifically adsorbed phages, adding Trypsin (Gibco, 25200072) and gently mixing to react for 20 min to elute the specifically bound antibody display phages. Subsequently, the eluted phage is used to infect the log phase SS320 strain (Lucigen, MC1061 F), standing for 30 min, then culturing at 220 rpm for 1 h; and then VSCM13 helper phage is added, standing for 30 min, then continuing to culture at 220 rpm for 1 h, centrifuging and replacing into C+/K+2-YT medium; the finally obtained phage will continue to be used in the next round of panning.

4.4.2 Screening Gene Library of Phage Display Antibody by Immuno-Tube Method

The principle of immuno-tube screening comprises the following processes: BCMA protein is coated on the surface of the immune tube with high adsorption capacity, the phage display antibody library is added to the immune tube and carried out the panning processes including incubation, washing and elution with the antigen protein adsorbed on the surface of the immune tube; after 2-4 rounds of panning, finally the monoclonal antibodies specific to the antigen are enriched. The purpose of the immunotube method and the magnetic bead method are both to enrich antibodies specific to the antigen, and are two complementary experimental methods. In this example, the principle is cross-panning by using human BCMA antigens and monkey BCMA antigens, wherein the human BCMA is used in the first and third rounds of panning, and the monkey BCMA is used in the second round of panning. A total of 3 rounds of are performed, and then the enriched antibody sequence mixture is subjected to a monoclonal preliminary screening of human BCMA and monkey BCMA. The particular implementation method is similar to the magnetic bead method.

4.5 Monoclonal Selection

After three rounds of panning, some monoclonals are selected from the third round of Pool for ELISA detection, including monoclonals binding to human BCMA and monkey BCMA. Finally, a total of 93 positive clones that can bind to both human BCMA and monkey BCMA are selected from the 1344 clones. After sequencing analysis and the analysis of the binding affinity of monoclonals to human and monkey BCMA, the sequences of 17 clones are finally selected to construct the full length of antibody for the next experiment.

Example 5

Construction, Expression and Purification of the Full-length Antibodies

In this example, the 17 human-monkey crossed Fab antibodies obtained from Example 4 are constructed as a human IgG1 type, in which the light chains are all Kappa, and the antibody type is a human-mouse chimeric antibody.

5.1 Construction of Plasmid

The heavy chain sequence of the sequence obtained by the screening is fused with the human IgG1 Fc fragment, and the light chain sequence of the sequence obtained by the screening is fused with the human Kappa constant region. The plasmids comprising the heavy chain and light chain are transformed into ExpiCHO cells to induce expression and obtain the full-length antibody.

5.2 Expression and Purification of Antibodies

In this application, the ExpiCHO transient expression system is used to express the antibodies, the medium is (Gibco, A29100-01), and the transfection kit is (Gibco, A29129). The particular method is as follows: the day before transfection, the ExpiCHO cells are passaged. In a 25 mL system, 25 µg of the constructed plasmid is mixed with the transfection reagent, then adding dropwise into 25 mL of ExpiCHO cells; after mixing well, expressing in a cell culture incubator at 37° C. for 18-22 h. Subsequently, feed medium is added to the above transfection mixture, then placing in a cell incubator at 32° C. to continue culturing; on day 5 after transfection, adding a second feed and placing the cells in a cell incubator at 32° C. to continue culturing for 10-12 days. Then, the expressed cell suspension is centrifuged at a high speed, and the supernatant is taken. The obtained supernatant is filtered through a 0.22 µm filter membrane, and purified by the affinity method using a Protein A/G affinity chromatography column. After purification, the target protein is eluted with 100 mM glycinate (pH 3.0), then concentrating, replacing, aliquoting; and after identifying by SDS-PAGE, SEC purity detection and activity identification, they are frozen for storage.

Example 6

Detection of Affinity Effect and Blocking Effect of Candidate Antibodies at ELISA Level In this example, based on ELISA method, the affinity effect of the candidate antibody on human BCMA and monkey BCMA is verified; and based on ELISA method, the effect of the candidate antibody in blocking the binding of BCMA to BAFF or APRIL is verified.

Figure 4A:
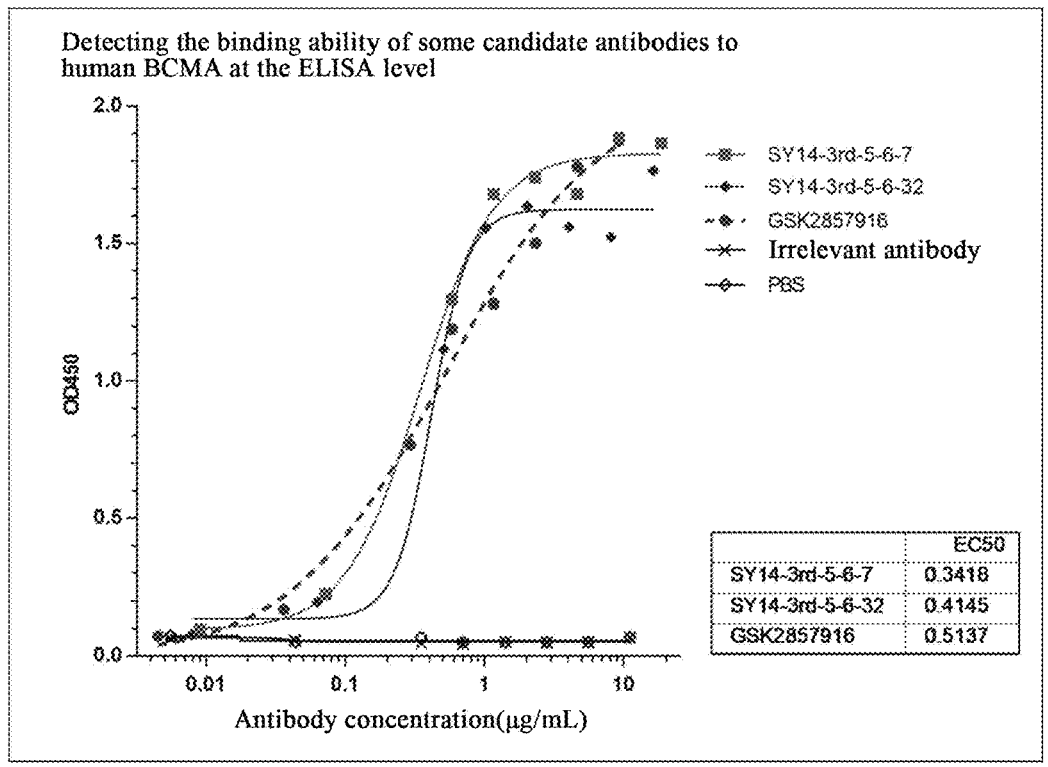
FIG. 4(A) shows the affinity effect of some candidate antibodies binding to human BCMA at the Elisa level, the results show that some candidate antibodies have close or even better affinity than the antibody GSK2857916.
Figure 4B:
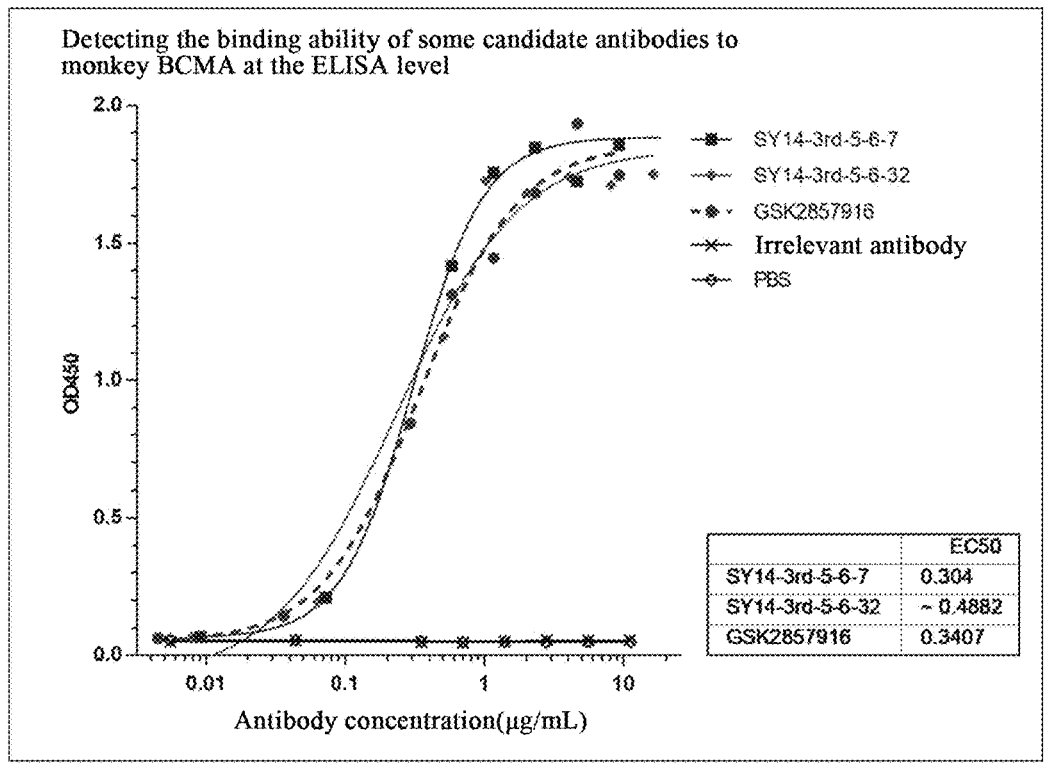
FIG. 4(B) shows the affinity effect of some candidate antibodies binding to monkey BCMA at the Elisa level, the results show that some candidate antibodies have close or even better affinity than the antibody GSK2857916.

6.1 Detecting the Affinity Effect of Candidate Antibodies on Human BCMA and Monkey BCMA Based on ELISA Human BCMA and monkey BCMA are coated on a 96-well ELISA plate respectively, at 2 µg/mL, 30 µL/well, overnight at 4° C. The next day, the plates are washed 3 times with PBST, and blocked with 5% skimmed milk for 2 h. After washing the plate 3 times with PBST, gradient dilutions of the candidate antibody and positive control antibody (GSK2857916) are added to incubate for 1 h. After that, washing 3 times with PBST, the secondary antibody (anti-human-IgG-Kappa-HRP, abcam, ab79115) is added to incubate for 1 h. After the incubation is completed, the plate is washed six times with PBST, and TMB (SurModics, TMBS-1000-01) is added for color development. According to the color development results, the reaction is terminated by adding 2M HCl, and the plate is read at OD450 with a microplate reader (Molecular Devices, SpecterMax 190). The results are shown in FIG. 4(A) to FIG. 4(B). The results show that the affinity affect of the candidate antibodies on human BCMA and monkey BCMA is close to or even better than that of antibody GSK2857916.

6.2 Detecting the Effect of Candidate Antibodies to Block the Binding of BCMA to BAFF Based on ELISA In this example, the blocking system includes a pre-development process, and according to the development results, the actual blocking system parameters with both sensitivity and stability are determined.

Figure 5A:
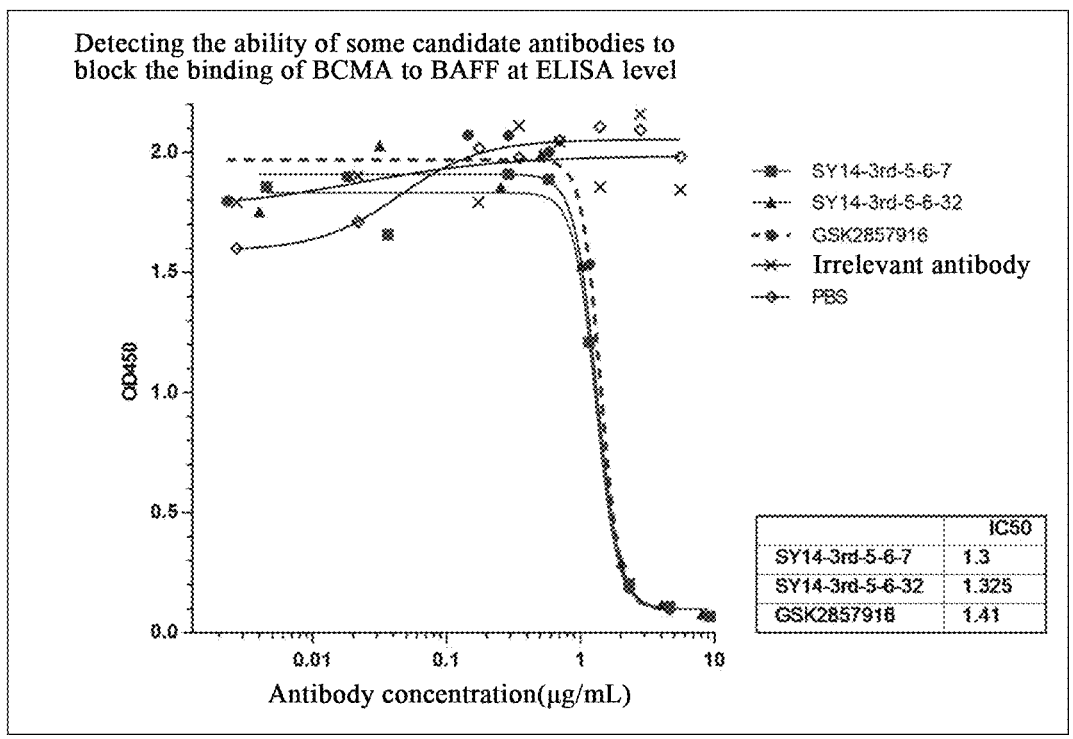
FIG. 5(A) shows that some candidate antibodies block the binding of BCMA to BAFF at the Elisa level, the results show that some candidate antibodies have close or even better blocking effects than the antibody GSK2857916.

For blocking BAFF, human BAFF protein is coated on a plate at 1 µg/mL, 30 µL/well, at 4° C. overnight. The next day, the well plate is washed 3 times with PBST, and then blocked with 5% skimmed milk for 2 h. Then, the candidate antibody or the positive control antibody (GSK2857916) is serially diluted, and premixed with Biotin-labeled human BCMA (0.6 µg/mL) for 0.5 h in advance, then adding to the 96-well ELISA plate to incubate for 1 h after completion of the blocking and washing. After washing 3 times with PBST, the secondary antibody (NeutrAvidin-HRP, Therofisher, 31001) is added to incubate for 1 h. After the incubation is completed, washing the plate six times with PBST, adding TMB (SurModics, TMBS-1000-01) for color development, and adding 2M HCl to stop the reaction according to the color development result, then reading the plate at OD450 with a microplate reader (Molecular Devices, SpecterMax 190), the results are shown in FIG. 5(A). The results show that, the candidate antibody has close or even better effect than GSK2857916 antibody in blocking the binding of human BCMA to BAFF.

6.3 Detecting the Effect of Candidate Antibodies to Block the Binding of BCMA to APRIL Based on ELISA In this example, the blocking system includes a pre-development process. According to the development results, the actual blocking system parameters with both sensitivity and stability are determined.

Figure 5B:
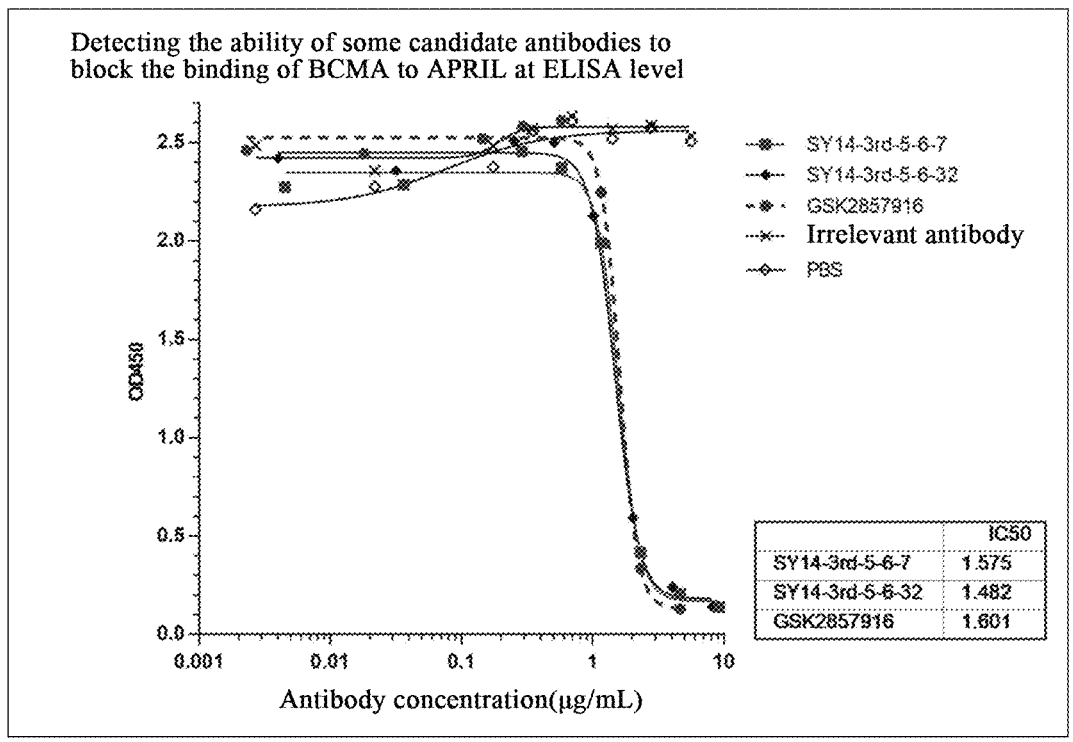
FIG. 5(B) shows that some candidate antibodies block the binding of BCMA to APRIL at the Elisa level, the results show that some candidate antibodies have close or even better blocking effects than the antibody GSK2857916.

For blocking APRIL, human APRIL protein is coated on a plate at 2 µg/mL, 30 µL/well, at 4° C. overnight. The next day, the well plate is washed 3 times with PBST, and then blocked with 5% skimmed milk for 1 h. Then, the candidate antibody or the positive control antibody (GSK2857916) is serially diluted, and premixed with Biotin-labeled human BCMA (0.6 µg/mL) for half an hour in advance, then adding to the 96-well flat bottom plate to incubate for 1 h after completion of the blocking and washing. After washing 3 times with PBST, the secondary antibody NeutrAvidin-HRP (Therofisher, 31001) is added to incubate for 1 h. After the incubation is completed, washing the plate six times with PBST, adding TMB (SurModics, TMBS-1000-01) for color development, and adding 2M HCl to stop the reaction according to the color development result, then reading the plate at OD450 with a microplate reader (Molecular Devices, SpecterMax 190), the results are shown in FIG. 5(B). The results show that, the candidate antibody has close or even better effect than GSK2857916 antibody in blocking the binding of human BCMA to APRIL.

Example 7

Detecting the Affinity Effect of Candidate Antibodies on Cell Lines Expressing Human and Monkey BCMA at the FACS Level In this example, the affinity effect of candidate antibodies on cells expressing human BCMA and monkey BCMA is verified based on the FACS method.

Figure 3A:
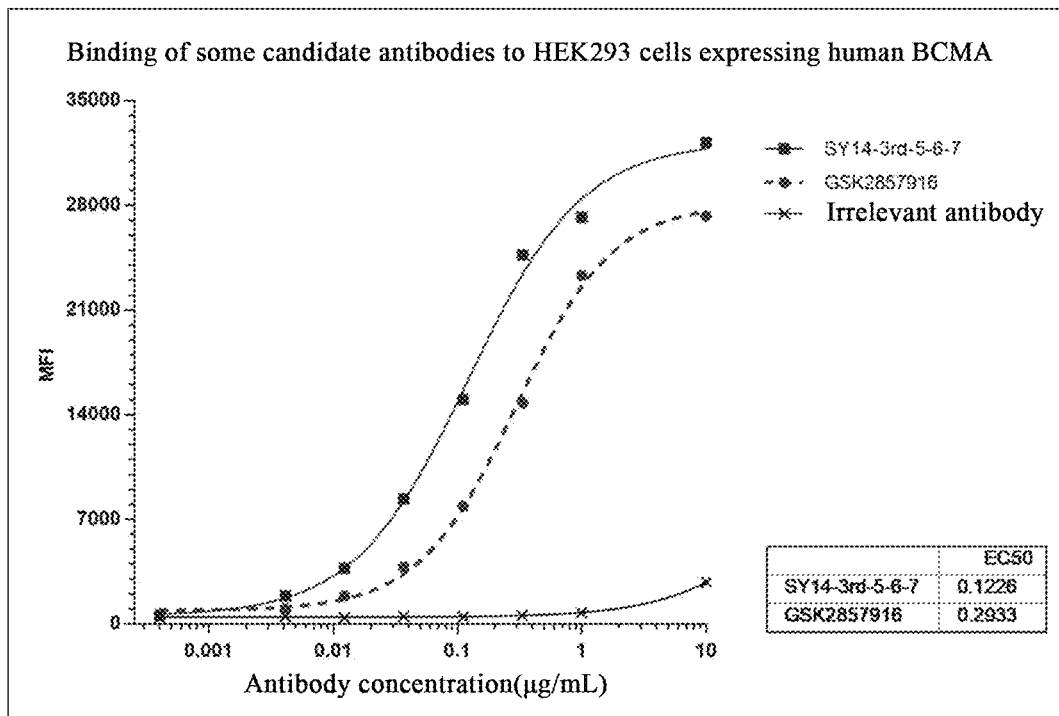
FIG. 3(A) shows the binding of some candidate antibodies to HEK293 cells overexpressing human BCMA determined by FACS.

7.1 Detecting the Affinity Effect of Candidate Antibodies on Human BCMA-HEK293 Cells Based on FACS Human BCMA-HEK293 cells are collected in the exponential growth phase, centrifuging at 300 g to remove the supernatant, resuspending the cells in the prepared FACS buffer, counting and adjusting the cell suspension density to $2 \times 10^6$/mL. Subsequently, BCMA-HEK293 cells are added to a 96-well round bottom plate at 100 µL per well, and the supernatant is removed by centrifugation at 300 g. Gradient dilutions of candidate antibody and positive control antibody are added to the corresponding wells, blowing the cells evenly with a Multichannel Pipettes to incubate at 4° C. for 30 min. The incubated cell mixture is centrifuged at 300 g to remove the supernatant, adding 200 µL of FACS buffer to the corresponding wells to resuspend the cells by using a Multichannel Pipettes; repeating twice, centrifuging at 300 g to remove the supernatant; adding PE-labeled anti-human-IgG-Fc flow cytometry antibody (Abcam, 98596), blowing the cells evenly with a Multichannel Pipettes to incubate at 4° C. for 30 min, then centrifuging at 300 g to remove the supernatant. Subsequently, FACS buffer is added to resuspend the cells. After repeating twice, FACS buffer is added to the wells, 200 µL per well, and the cells are resuspended and finally detected by flow cytometer (Beckman, CytoFLEX A00-1-1102). In this example, the results are shown in FIG. 3(A). The results show that, the affinity effect of the antibody SY14-3rd-5-6-7 on human BCMA-HEK293 cells is better than that of the positive control antibody (GSK2857916).

Figure 3B:
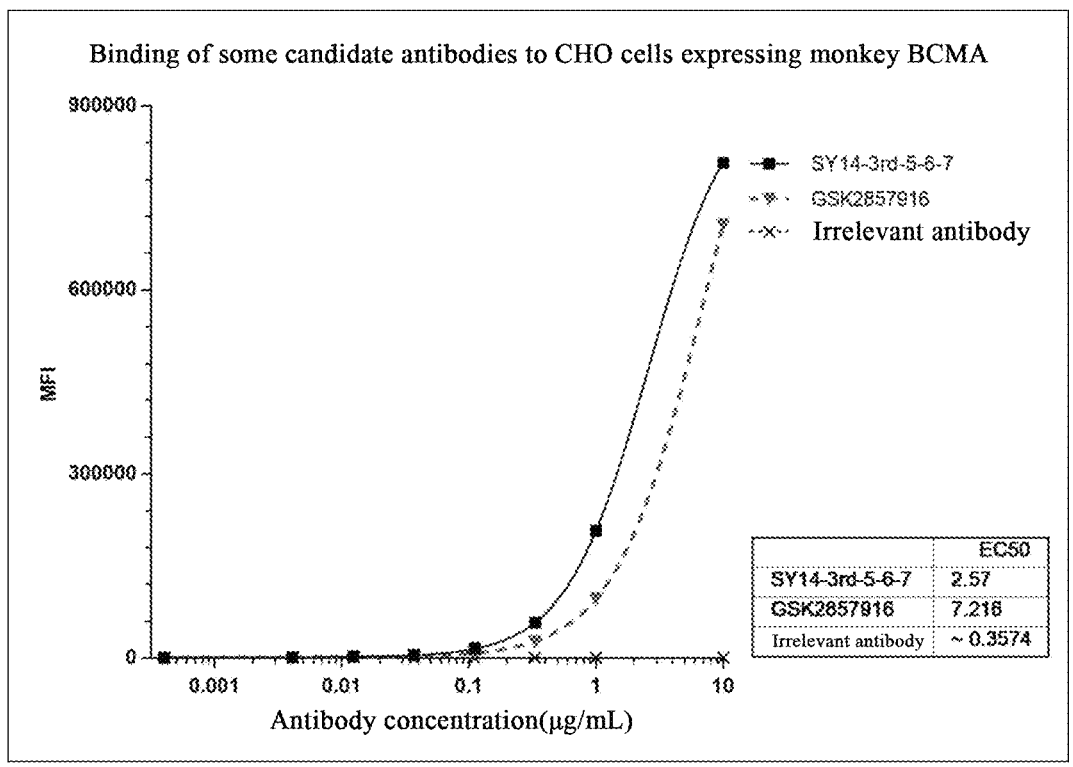
FIG. 3(B) shows the binding of some candidate antibodies to CHO cells overexpressing monkey BCMA determined by FACS.

7.2 Detecting the Affinity Effect of Candidate Antibodies on Monkey BCMA-CHO Cells Based on FACS In this example, the operating procedure is completely the same as 7.1 except that the cells are monkey BCMA-CHO cells. The results are shown in FIG. 3(B). The results show that, the affinity effect of the antibody SY14-3rd-5-6-7 on monkey BCMA-CHO cells is better than that of the positive control antibody (GSK2857916). In addition, the signal difference between human and monkey may be caused by the difference in BCMA expression on BCMA-HEK293 or BCMA-CHO.

Example 8

Detection of the Endocytosis Effect of Candidate Antibodies

In this example, a method and system for detecting the endocytosis of antibodies on the human myeloma cell line H929 is developed, and the endocytosis effect of the candidate antibodies is detected accordingly. The basic principle is to detect the endocytosis of antibodies by cytotoxicity. Fab-ZAP (Atsbio, IT-51-100) is a Fab fragment linked with saporin, which is a ribosome inhibitor that can inhibit protein synthesis and cause cell death. In this example, Fab-ZAP is a Fab fragment that can bind to human antibody Fc. After Fab-ZAP and anti-BCMA antibody are incubated together, the antibody carries with toxin. When the anti-BCMA antibody is endocytosed by a H929 cell, the toxin enters the cell with the antibody and causes the cell to die. Therefore, the endocytosis effect of the antibody can be detected by detecting the activity of the cells by MTS kit (Promega, G3580).

The particular detection method is as follows: H929 cells are resuscitated one week in advance, and passaged every 3 days after resuscitation. The seeding density of the cells is $2 \times 10^5$/mL each time, and the period of the cell passage does not exceed 3 weeks. Cells in the logarithmic growth phase are aspirated and mixed thoroughly, counting and determining their viability. A 96-well flat bottom plate is taken, and the cell density is adjusted to $4 \times 10^5$/mL, adding 50 µL of cells to each well, gently tapping to mix well, and placing the cell culture plate in a cell incubator at 37° C. for 16 hours. Then 1640+10% FBS+1% PS+50 µM β-mercaptoethanol complete medium is used to prepare Fab-ZAP into a 27 nM (2.16 µg/ml) dilution, adding it to the gradient dilution of the antibody to make the final concentration of incubated Fab-ZAP is 13.5 nM (1.08 µg/ml). According to the designed layout of the plate, a 300 µL Multichannel Pipettes is used to take 50 µL of dilution from the dilution plate to add into the cell plate, tapping gently to mix well, and placing it in the cell incubator for 3 days. After that, the MTS is thawed at room temperature in advance, taking the cell plate out of the incubator; a 100 µL 12-channel pipette is used to add 20 µL of MTS to each well, tapping gently to incubate in the incubator for 2 h, finally the cell plate is put into the microplate reader, reading at a wavelength of 492 nm and saving it.

Figure 6A:
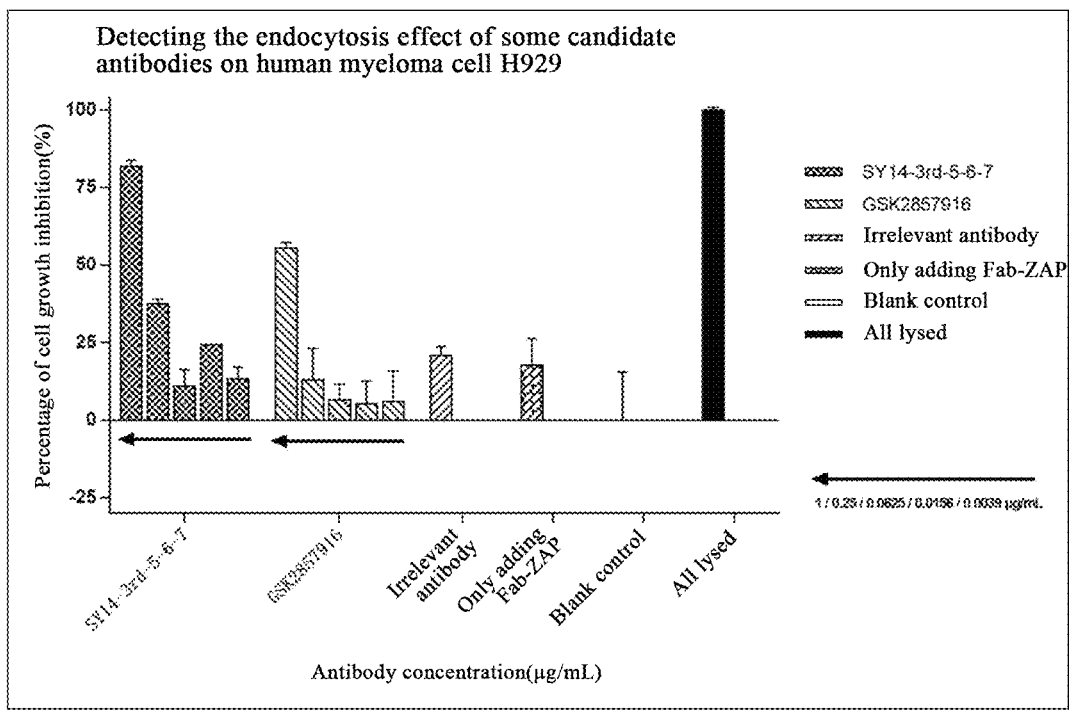
FIG. 6 shows the detection results of the endocytosis effect.
Figure 6B:
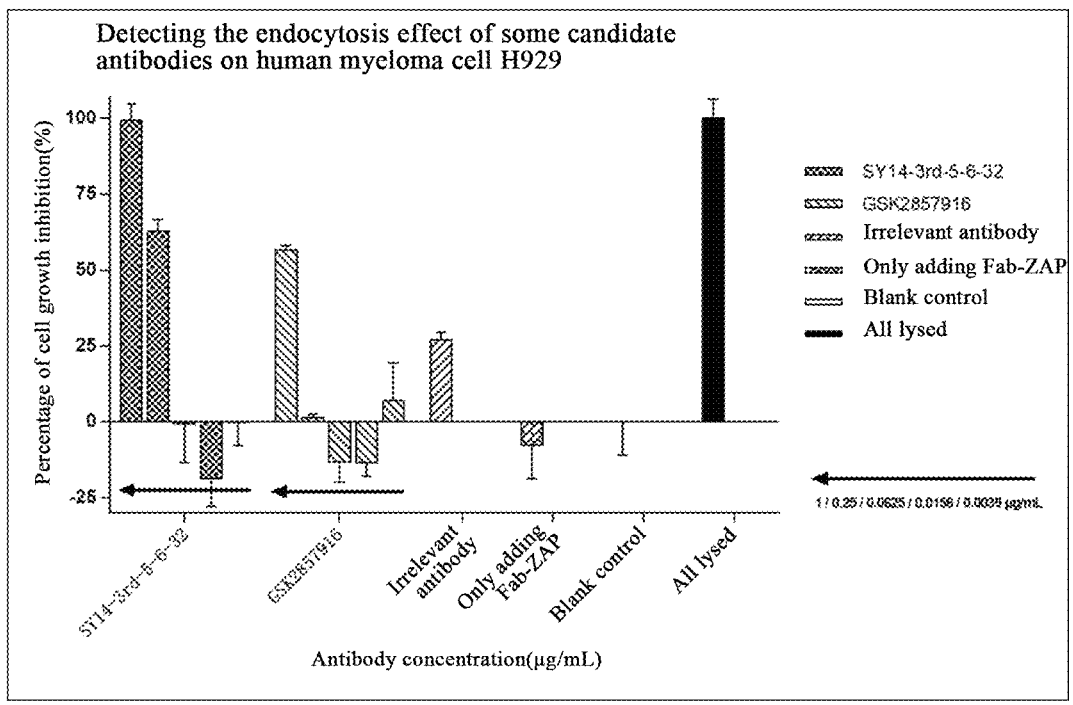

In this example, the results are shown in FIGS. 6(A) and 6(B). The results show that, the endocytosis effect of the candidate antibodies SY14-3rd-5-6-7 and SY14-3rd-5-6-32 is better than that of the positive control antibody (GSK2857916).

So far, all the detection results of the candidate antibodies are summarized in FIG. 7.

Example 9

Antibody Humanization

In this example, amino acid point mutations are carried out on the framework of the V region of the murine antibody heavy chain and light chain to make them more similar to human Germline. Particularly, the modified candidate antibodies include SY14-3rd-5-6-7 (also known as 5-6-7 or 5-6-7-WT) and SY14-3rd-5-6-32 (also known as 5-6-32 or 5-6-32-WT), wherein the preferred candidate antibodies after modification are referred to as 5-6-7-hu-2 and 5-6-32-hu-2, respectively.

Example 10

Figure 8A:
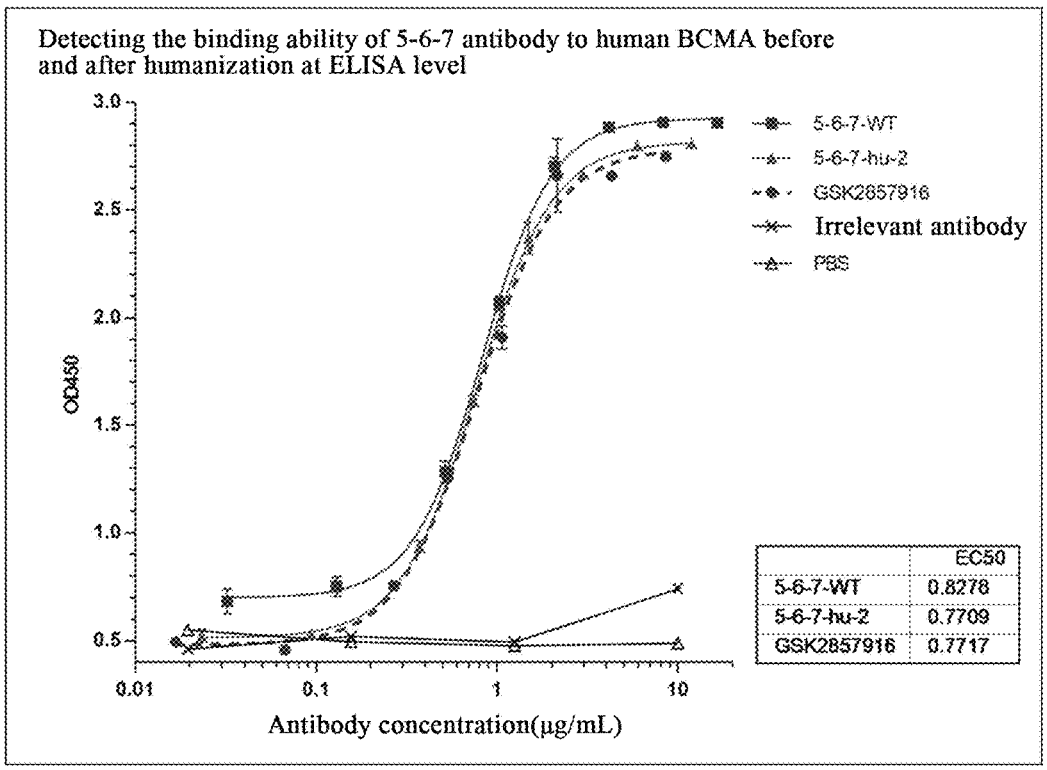
FIG. 8 shows the detection results of the affinity of the cross-reactivity of the humanized antibody (5-6-7-hu-2) with human BCMA and monkey BCMA.
FIG. 8(B) shows the detection of the affinity effect of antibody SY14-3rd-5-6-7 binding to monkey BCMA at the Elisa level before and after humanization, the results show that the affinity of the antibody binding to monkey BCMA after humanization is consistent with that before humanization.
Figure 8B:
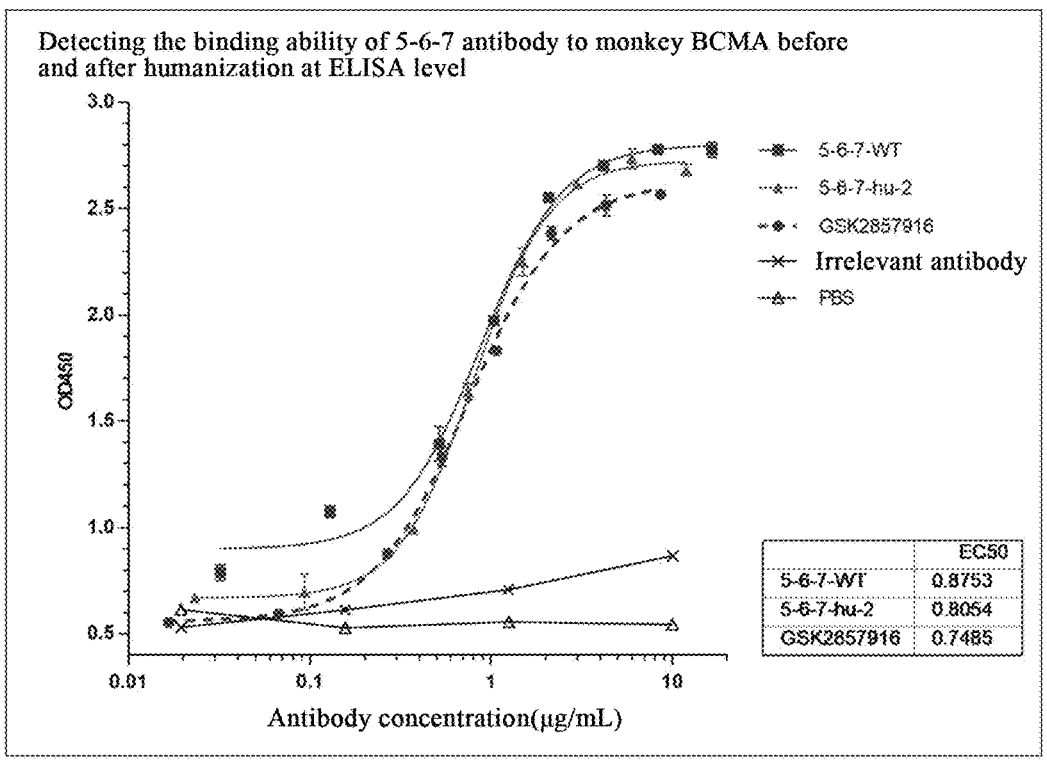
Figure 9A:
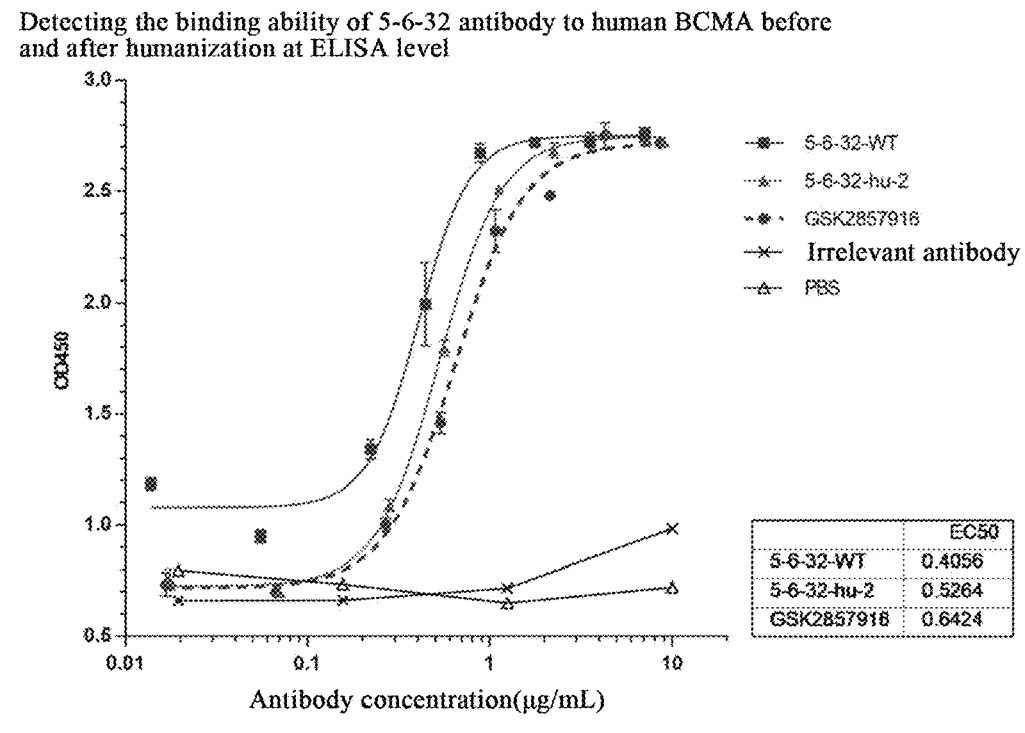
FIG. 9(A) shows the detection of the affinity effect of antibody SY14-3rd-5-6-32 (also known as 5-6-32 or 5-6-32-WT) binding to human BCMA at the Elisa level before and after humanization, the results show that the affinity of the antibody binding to human BCMA after humanization is still better than that of the positive antibody (GSK2857916).
Figure 9B:
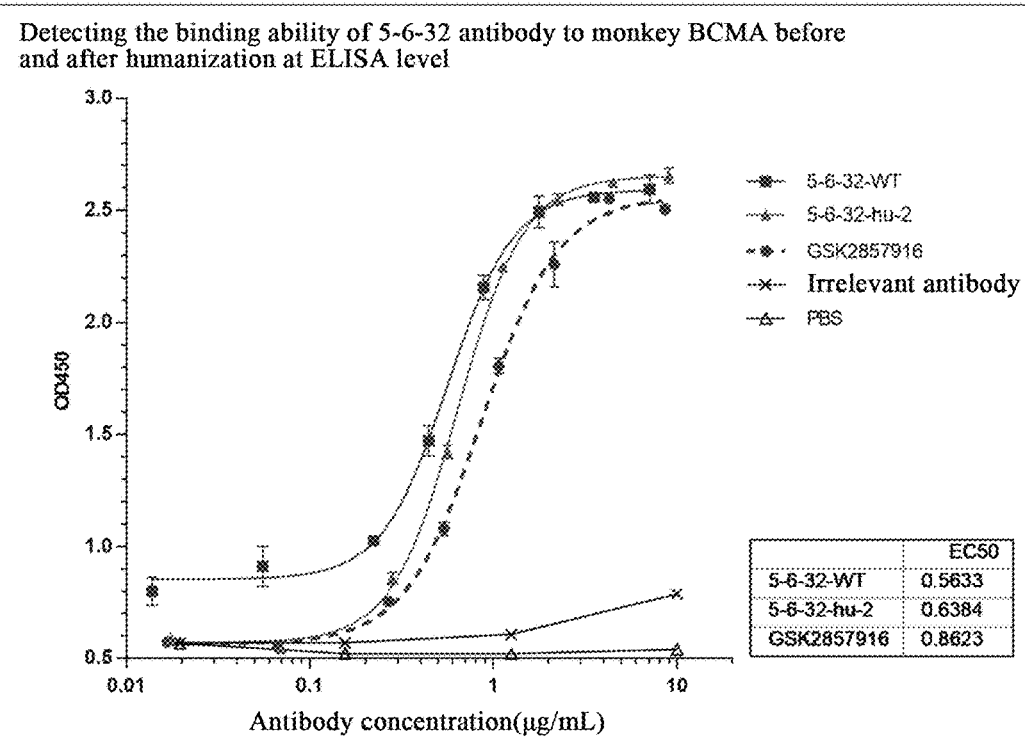
FIG. 9(B) shows the detection of the affinity effect of antibody SY14-3rd-5-6-32 binding to monkey BCMA at the Elisa level before and after humanization, the results show that the affinity of the antibody binding to monkey BCMA after humanization is still better than that of positive antibody GSK2857916.

Function Verification of Humanized Antibodies 10.1 Detecting the Affinity Effect of Two Candidate Antibodies on Human BCMA and Monkey BCMA Before and After Humanization Based on ELISA Referring to Example 6 for the particular operation method. The results are shown in FIG. 8 (A), FIG. 8 (B), FIG. 9 (A) and FIG. 9 (B). The results show that, the binding activities of the antibody to human and monkey BCMA before and after humanization are substantively consistent.

Figure 10A:
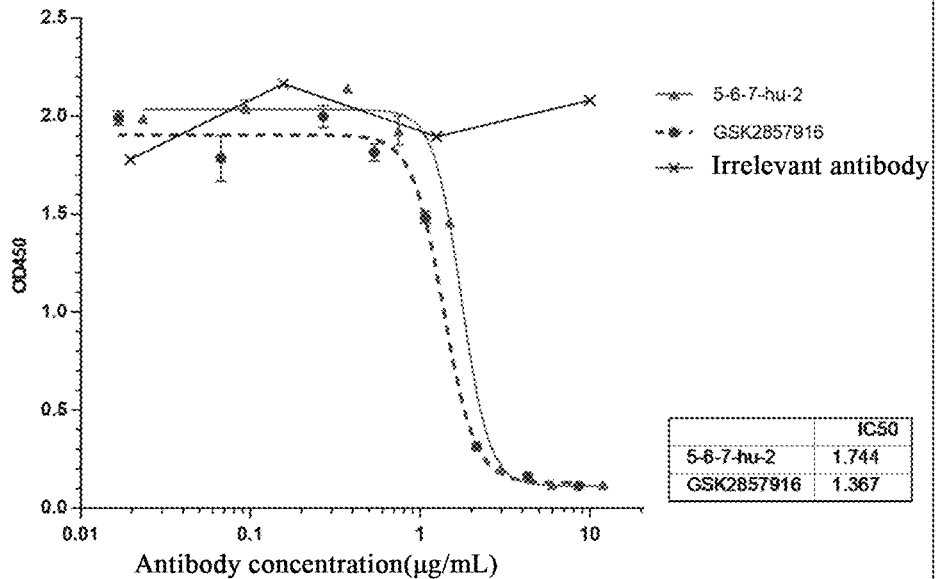
FIG. 10(A) shows the detection of the ability of antibody SY14-3rd-5-6-7 (also known as 5-6-7 or 5-6-7-WT) to block the binding of BCMA to BAFF at the Elisa level after humanization, the results show that the effect of the antibody to block the binding of BCMA to BAFF after humanization is slightly worse than that of positive antibody (GSK2857916).
Figure 11A:
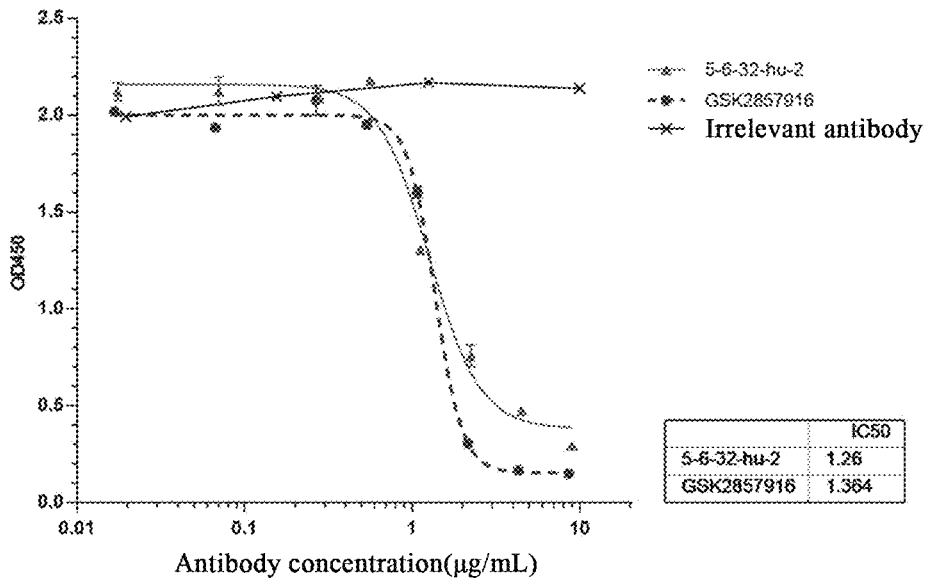
FIG. 11(A) shows the detection of the ability of antibody SY14-3rd-5-6-32 (also known as 5-6-32 or 5-6-32-WT) to block the binding of BCMA to BAFF at the Elisa level after humanization, the results show that the effect of the antibody to block the binding of BCMA to BAFF after the humanization is slightly worse than that of the positive antibody (GSK2857916).

10.2 Detecting the Effect of Two Candidate Antibodies to Block the Binding of BCMA to BAFF Before and After the Humanization Based on ELISA Referring to Example 6 for particular operations, and the results are shown in FIGS. 10(A) and 11(A). The results show that, the humanized antibody has a slightly lower effect on blocking the binding of BCMA to BAFF than the positive antibody.

Figure 10B:
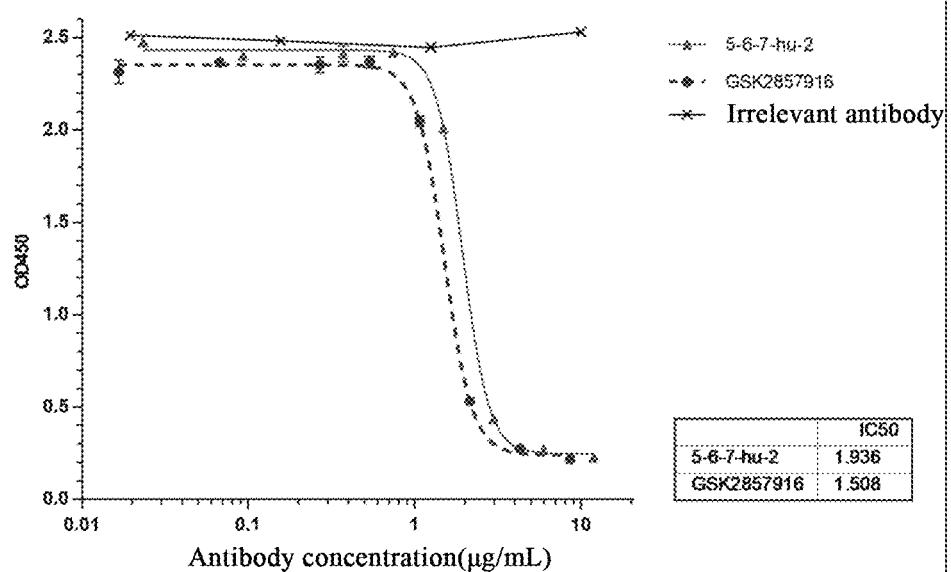
FIG. 10(B) shows the detection of the ability of the antibody SY14-3rd-5-6-7 to block the binding of BCMA to APRIL at the Elisa level after the humanization, the results show that the effect of the antibody to block BCMA binding to APRIL after humanization is slightly worse than that of positive antibody (GSK2857916).
Figure 11B:
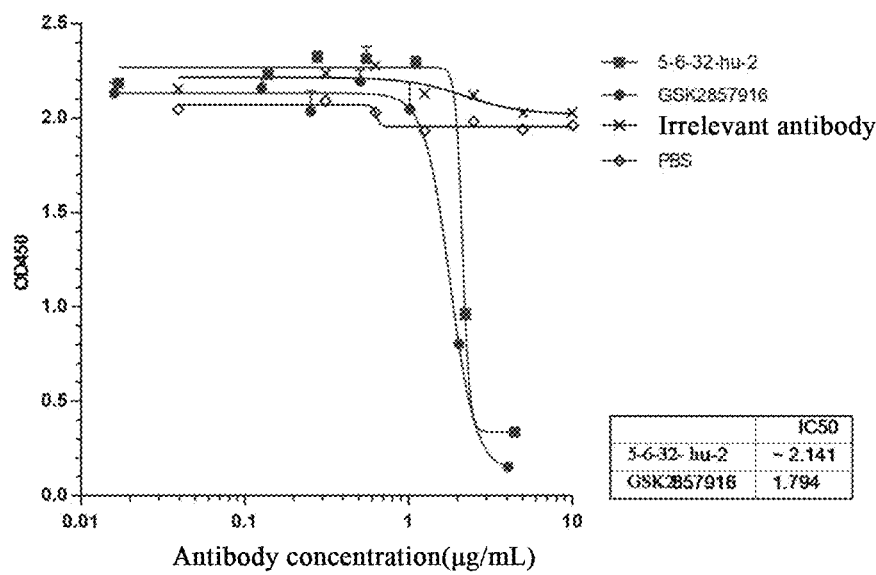
FIG. 11(B) shows the detection of the ability of antibody SY14-3rd-5-6-32 to block the binding of BCMA to APRIL at the Elisa level after humanization is slightly worse than that of the positive antibody (GSK2857916).

10.3 Detecting the Effect of Two Candidate Antibodies to Block the Binding of BCMA to APRIL Before and After Humanization Based on ELISA Referring to Example 6 for particular operations, and the results are shown in FIG. 10(B) and FIG. 11(B). The results show that, the humanized antibody has a slightly lower effect on blocking the binding of BCMA to APRIL than the positive antibody.

Figure 12A:
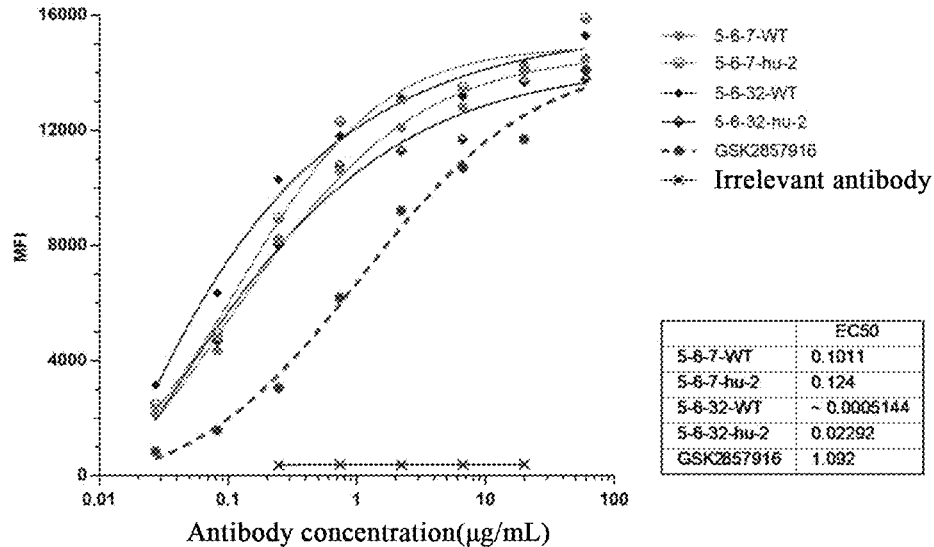
FIG. 12(A) shows the detection of the binding ability of antibodies 5-6-7 and 5-6-32 to HEK293 cells overexpressing human BCMA before and after humanization, the results show that the binding ability of the antibodies to HEK293 cells after humanization is consistent with that before humanization, and is better than that of the antibody GSK2857916.

10.4 Detecting the Affinity Effect of Candidate Antibodies on Human BCMA-HEK293 Cells Based on FACS Referring to Example 7 for particular operations, and the results are shown in FIG. 12(A). The results show that, the binding effects of the antibody to human BCMA-HEK293 cells before and after humanization are substantively the same, and both are better than the positive control antibody (GSK2857916).

Figure 12B:
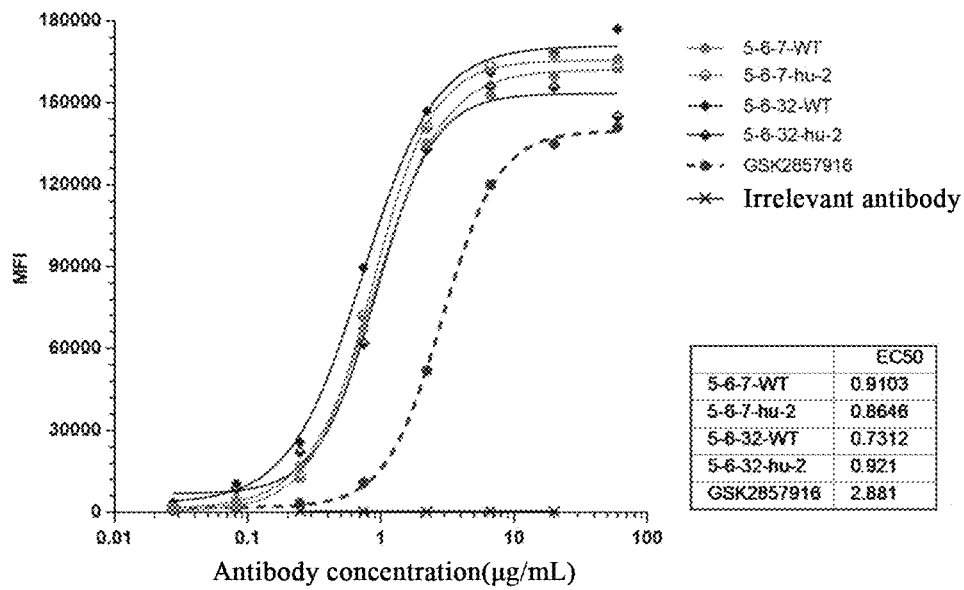
FIG. 12(B) shows the detection of the binding ability of antibodies 5-6-7 and 5-6-32 to CHO cells overexpressing monkey BCMA before and after humanization, the results show that the binding ability of the antibodies to CHO cells after humanization is consistent with that before humanization, and is better than that of the GSK2857916 antibody.

10.5 Detecting the Affinity Effect of Candidate Antibodies on Monkey BCMA-CHO Cells Based on FACS Referring to Example 7 for particular operations, and the results are shown in FIG. 12(B). The results show that, the binding effects of the antibody to monkey BCMA-CHO cells before and after humanization are substantively the same, and both are better than that of the positive control antibody (GSK2857916).

Figure 12C:
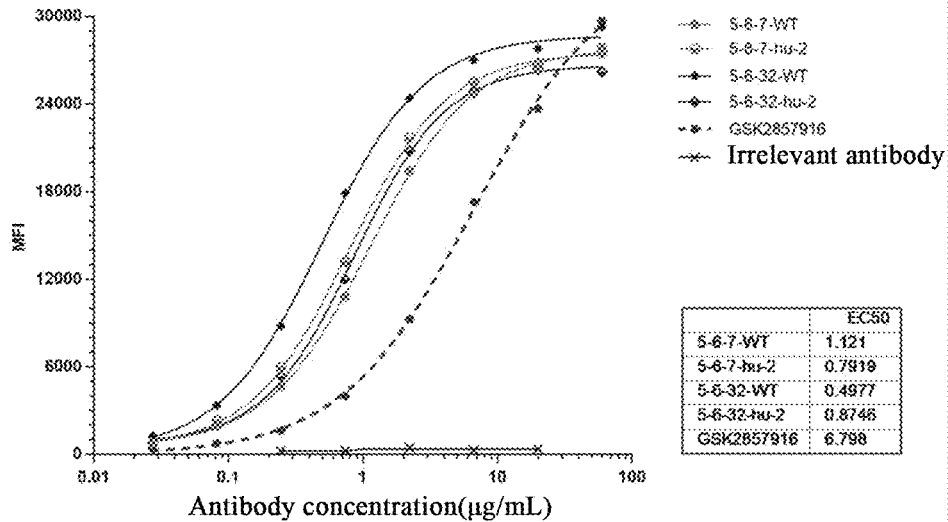
FIG. 12 shows the detection results of the binding activity of antibodies before and after humanization to cells highly expressing human BCMA and monkey BCMA.

10.6 Detecting the Affinity Effect of Candidate Antibodies on Human Myeloma Cell Line H929 Cells Based on FACS Referring to Example 7 for particular operations, and the results are shown in FIG. 12(C). The results show that, the binding effects of the antibody to H929 cells before and after humanization are substantively the same, and both are better than that of the positive control antibody (GSK2857916).

10.7 Detection of Endocytosis of Antibodies Before and After Humanization

Figure 13A:
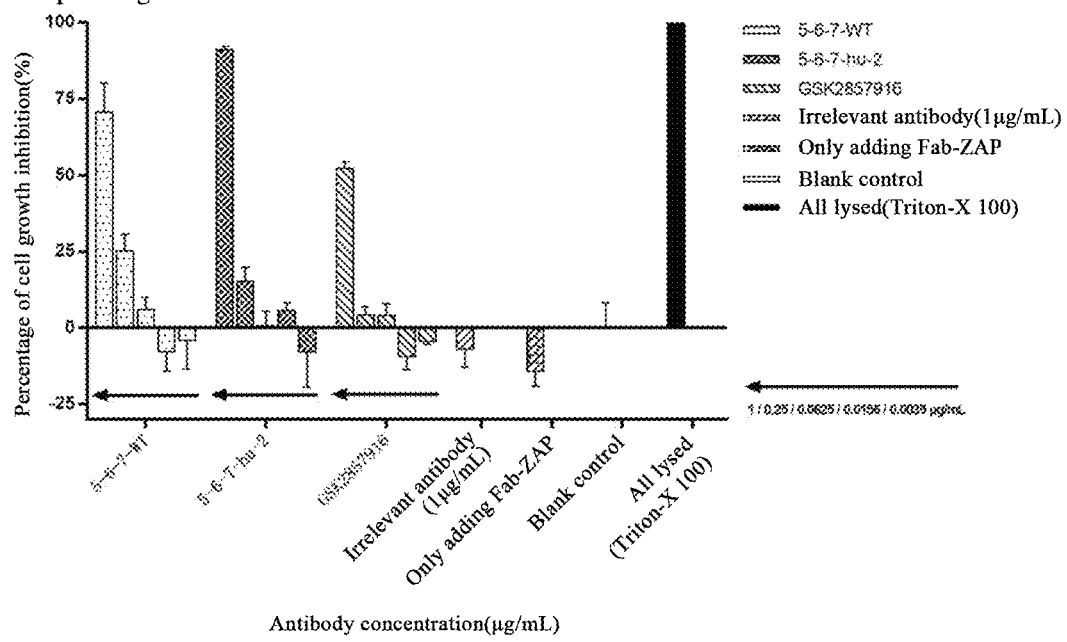
FIG. 13(A) shows the detection of the endocytosis effect of antibody 5-6-7 on human myeloma cell line H929 cells expressing BCMA before and after humanization, the results show that the endocytosis effect of the antibody after humanization is consistent with that before humanization, and is better than that of the antibody GSK2857916.
Figure 13B:
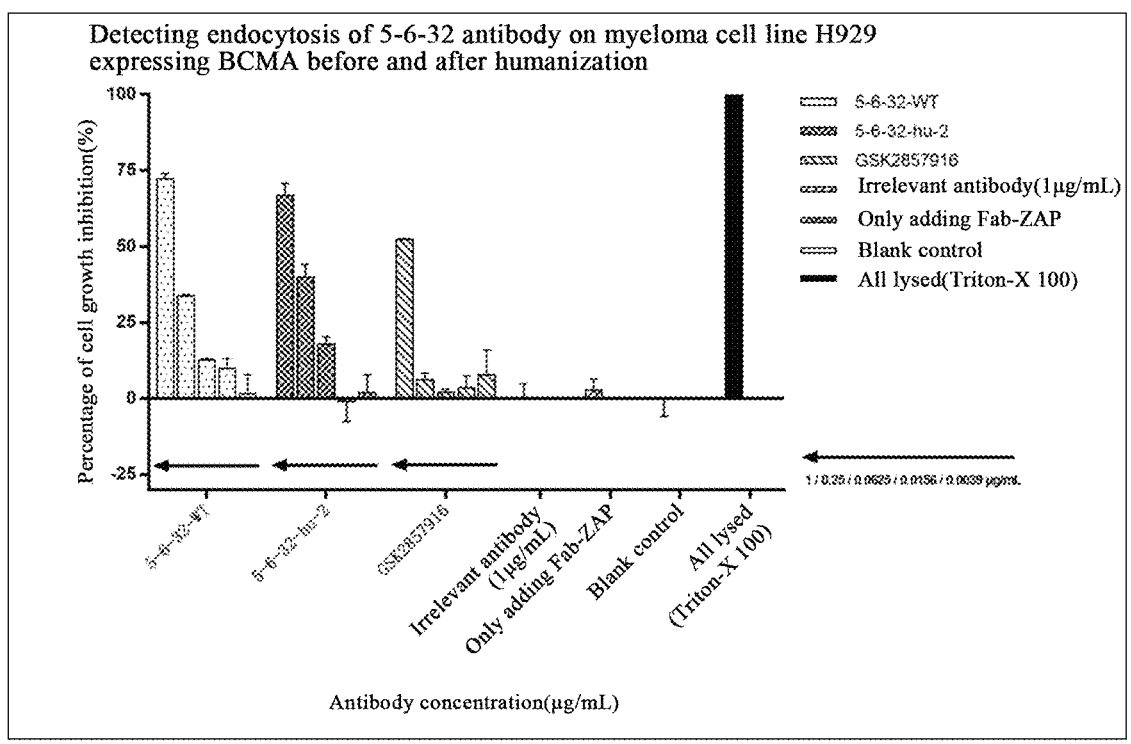
FIG. 13(B) shows the detection of the endocytosis effect of antibody 5-6-7 on human myeloma cell line H929 cells expressing BCMA before and after humanization, the results show that the endocytosis effect of the antibody after humanization is consistent with that before humanization, and is better than that of antibody GSK2857916.

In this example, the endocytosis effect of the two candidate antibodies on the human myeloma cell line H929 before and after the humanization transformation is also detected. For particular operations, see Example 8, and the results are shown in FIGS. 13-A and 13-B. The results show that, the endocytosis effect of the humanized antibody 5-6-7-huV2 is better than that of the antibody (5-6-7-WT) before humanization. The endocytosis effects of other antibodies before and after humanization on the human myeloma cell line H929 cells are substantively the same, and are better than that of the positive control antibody (GSK2857916).

So far, all the detection results of the two candidate antibodies before and after the humanization are summarized in FIG. 14.

Example 11

DSF Detection of Candidate Antibodies Before and After Humanization

In this example, the thermal stability data of the two candidate antibodies before and after humanization and the positive control antibody (GSK2857916) are detected. The particular process is as follows: preparing antibody solution, 0.25 mg/mL, 19 μL/well, setting three parallel wells for each test product, and using PBS and IPI as references; then adding 1 μL of SYPRO orange dye at a concentration of 100× to each well, and preparing for detection on the equipment. ABI 7500 FAST RT-PCR instrument is used for detection, selecting melting curve for detection type, adopting continuous mode with scan temperature range 25-95° C. and 1% of heating rate, equilibrating at 25° C. for 5 min, collecting data during the heating process, selecting ROX for the report group and None for the quenching group with a reaction volume of 20 μL. The temperature corresponding to the first peak valley of the first derivative of the melting curve is determined as the denaturation temperature of the candidate antibody. The results are shown in Table 1-3.

TABLE 1-3

Test results of thermal stability of humanized antibodies

|  | DSF detection Tm values ° C. |
| --- | --- |
| 5-6-7 | 81.4 |
| 5-6-7-hu-2 | 70.0 |
| 5-6-32 | 68.4 |
| 5-6-32-hu-2 | 71.1 |
| GSK2857916 | 69.4 |

Example 12

Detecting the Affinity of Candidate Antibodies Before and After Humanization In this example, the Fortebio Octet RED96 instrument is used to detect the binding affinity of candidate antibodies of 5-6-7 and 5-6-32 before and after humanization to human BCMA and monkey BCMA.

12.1 Material Preparation 1 g of BSA is weighed and 500 μL of Tween 20 is measured to add into 1000 mL of 1×PBS to mix well. After filtering, the mixture is stored in aliquots. 0.1 mL of glycine solution (0.1M, pH=2.0) is pipetted into 0.9 mL of ultrapure water to mix well. The antibody is diluted with KB buffer to 10 μg/mL, and the antigen is diluted with KB buffer into a series of concentration gradients of 200, 50, 12.5, and 0 nM.

12.2 Experimental Procedure

The sensor (Anti-Human Fba-CH1 2nd Generation, FAB2G) is pre-wet at least 10 minutes by avoiding light, then starting to test the sample plate (GreinierBio, PN655209), after the sample is tested correct, proceeding according to the preset procedure. Particularly, KB buffer is added at 200 μL/well to columns 1, 10 and 12 of sample plate 1, 0.01M glycine solution (pH2.0) is added to column 11, and the prepared sample solution is added to columns 2-8 (one sample is added to 4 wells, i.e., 2 samples are added in one column), human BCMA-Fc is added to the ninth column according to the concentration from high to low, i.e., 200 nM antigen solution is added to the first and fifth wells, 50 nM antigen solution is added to the second and sixth wells, 12.5 nM antigen solution is added to the 3rd and 7th wells, and 0 nM antigen solution is added to the 4th and 8th wells. The preparation of sample plate 2 remains unchanged except that the antigen in the ninth column is replaced with monkey BCMA protein. The data results are shown in Table 1-4.

SEQ ID NO: 1
GHIFTNFHFH

SEQ ID NO: 2
GYIFTNYHMH

SEQ ID NO: 3
GIYPGNGDTF

SEQ ID NO: 4
GIYPGNGDIF

SEQ ID NO: 5
GSYYGYIDAMDY

SEQ ID NO: 6
GSYYGYIDAMDY

SEQ ID NO: 7
RASQDISNYLN

SEQ ID NO: 8
RASQDISNDLN

SEQ ID NO: 9
YTSRLHS

SEQ ID NO: 10
YTSRLPS

SEQ ID NO: 11
QQGNTLPWT

SEQ ID NO: 12
QQGHTLPWT

SEQ ID NO: 13
DIQMTQSPSSLSASVGDRVTITCRASQDISNYLNWYQQKPGKAVKLLIY
YTSRLHSGVPSRFSGSGSGTDFTLTISSLQPEDIATYYCQQGNTLPWTF
GQGTKLEIK

TABLE 1-4

Detection results of the binding affinity of humanized antibody to human BCMA or monkey BCMA

| | Detection of the binding affinity of humanized antibody to human BCMA | | | | Detection of the binding affinity of humanized antibody g to monkey BCMA | | | |
|---|---|---|---|---|---|---|---|---|
| | KD (M) | Kon (1/Ms) | Kdis (1/s) | R2 | KD (M) | Kon (1/Ms) | Kdis (1/s) | R2 |
| 5-6-7 | $1.01 \times 10^{-10}$ | $1.76 \times 10^{+05}$ | $1.78 \times 10^{-05}$ | 0.99 | $3.54 \times 10^{-10}$ | $2.90 \times 10^{+05}$ | $1.03 \times 10^{-04}$ | 0.99 |
| 5-6-7-hu-2 | $<1.01 \times 10^{-12}$ | $2.96 \times 10^{+05}$ | $<1.01 \times 10^{-07}$ | 0.99 | $2.93 \times 10^{-11}$ | $5.12 \times 10^{+05}$ | $1.50 \times 10^{-05}$ | 0.99 |
| 5-6-32 | $2.12 \times 10^{-10}$ | $2.29 \times 10^{+05}$ | $4.85 \times 10^{-05}$ | 0.99 | $6.38 \times 10^{-10}$ | $3.72 \times 10^{+05}$ | $2.37 \times 10^{-04}$ | 0.99 |
| 5-6-32-hu-2 | $4.66 \times 10^{-10}$ | $3.49 \times 10^{+05}$ | $1.63 \times 10^{-04}$ | 0.99 | $6.53 \times 10^{-10}$ | $6.06 \times 10^{+05}$ | $3.96 \times 10^{-04}$ | 0.99 |
| GSK2857916 | $5.39 \times 10^{-11}$ | $2.20 \times 10^{+05}$ | $1.19 \times 10^{-05}$ | 0.99 | $3.52 \times 10^{-10}$ | $3.17 \times 10^{+05}$ | $1.11 \times 10^{-04}$ | 0.99 |

Example 13

5-6-7-hu-2 and 5-6-32-hu-2 are selected based on the above examples to be analyzed and sequenced. Based on the IMGT database (http://www.imgt.org/), the variable region of the human antibody sequence is defined, and the sequences of the variable region of the light chain and the variable region of the heavy chain of the antibody according to the present invention (SEQ ID NOs: 13-16) are determined. The sequences of the variable region is analyzed, and AbM is used to define the CDR to determine the sequences of the complementarity determining regions of the light chain and the heavy chain of the antibody (SEQ ID NOs: 1-12).

The particular sequences protected by the present invention are as follows:

-continued

SEQ ID NO: 14
DIQMTQSPSSLSASVGDRVTITCRASQDISNDLNWYQQKPGKAPKLLIY
YTSRLPSGVPSRFSGSGSGTDFTLTISSLQPEDIATYYCQQGHTLPWTF
GQGTKLEIK

SEQ ID NO: 15
QVQLVQSGAEVKKPGSSVKISCKASGHIFTNFHFHWVRQAPGQGLEWIG
GIYPGNGDTFYNQKFQGRATITADKSTSTAYMELSSLRSEDTAVYYCVR
GSYYGYIDAMDYWGQGTSVTVSS

SEQ ID NO: 16
QVQLVQSGAEVKKPGASVKMSCKASGYIFTNYHMHWVRQAPGQGLEWIG

GIYPGNGDIFYAQKFQGRATITADKSTSTAYIELSSMRSEDTAVYYCAR

GSYYGYIDAMDYWGQGTSVTVSS

SEQ ID NO: 17
DIQMTQSPSSLSASVGDRVTITCSASQDISNYLNWYQQKPGKAPKLLIY

YTSNLHSGVPSRFSGSGSGTDFTLTISSLQPEDFATYYCQQYRKLPWTF

GQGTKLEIK

SEQ ID NO: 18
QVQLVQSGAEVKKPGSSVKVSCKASGGTFSNYWMHWVRQAPGQGLEWMG

ATYRGHSDTYYNQKFKGRVTITADKSTSTAYMELSSLRSEDTAVYYCAR

GAIYDGYDVLDNWGQGTLVTVSS

The purpose, technical solutions and beneficial effects of the present invention are described in details through the above particular Examples. It should be understood that, the above descriptions are only particular examples of the present invention, and are not intended to limit the present invention. Within the spirit and principle of the present invention, any modification, equivalent replacement, improvement, etc., shall be included in the protection scope of the present invention.

The invention claimed is:

1. An isolated monoclonal antibody targeting B cell maturation antigen (BCMA), wherein the antibody can bind to both human BCMA and monkey BCMA
wherein the antibody comprises a heavy chain variable region and a light chain variable region,
wherein the heavy chain variable region of the antibody comprises
a heavy chain complementarity determining region 1 (CDR-H1) comprising an amino acid sequence as set forth in SEQ ID NO: 1,
a heavy chain complementarity determining region 2 (CDR-H2) comprising an amino acid sequence as set forth in SEQ ID NO: 3, and
a heavy chain complementarity determining region 3 (CDR-H3) comprising an amino acid sequence as set forth in SEQ ID NO: 5; and,
wherein the light chain variable region of the antibody comprises:
a light chain complementarity determining region 1 (CDR-L1) comprising an amino acid sequence as set forth in SEQ ID NO: 7,
a light chain complementarity determining region 2 (CDR-L2) comprising an amino acid sequence as set forth in SEQ ID NO: 9, and
a light chain complementarity determining region 3 (CDR-L3) comprising an amino acid sequence as set forth in SEQ ID NO: 11.

2. The antibody according to claim 1, characterized in that the light chain variable region of the antibody has the sequence as set forth in SEQ ID NO: 13, or has a sequence with at least 80% similarity to SEQ ID NO: 13 and the heavy chain variable region of the antibody the heavy chain variable region of the antibody the heavy chain variable region of the antibody has the sequence as set forth in SEQ ID NO: 15, or has a sequence with at least 80% similarity to SEQ ID NO: 15.

3. A nucleic acid encoding the antibody according to claim 1.

4. A method for treating a disease related to the expression of BCMA, comprising:
   administrating the monoclonal antibody according to claim 1 to a subject in need thereof.

5. The method according to claim 4, wherein the disease is selected from the group consisting of: B-cell acute lymphocytic leukemia, T-cell acute lymphocytic leukemia, acute lymphocytic leukemia, chronic myelogenous leukemia, chronic lymphocytic leukemia, B-cell prolymphocytic leukemia, blastic plasmacytoid dendritic cell neoplasm, Burkitt lymphoma, diffuse large B cell lymphoma, follicular lymphoma, hairy cell leukemia, small cell or large cell follicular lymphoma, malignant lymphoma, malignant lymphoproliferative condition, MALT lymphoma, mantle cell lymphoma, marginal zone lymphoma, multiple myeloma, myelodysplastic and bone marrow hyperplasia syndrome, non-Hodgkin lymphoma, plasmablastic lymphoma, plasmacytoid dendritic cell neoplasm, Waldenstrom's macroglobulinemia, myeloma, MGUS, plasmacytoma, systemic amyloid light chain amyloidosis, and POEMS syndrome.

6. The method according to claim 4, wherein the disease is multiple myeloma.

7. An expression vector comprising the nucleic acid of claim 3.

8. A host cell
   comprising an expression vector comprising the nucleic acid of claim 3, or
   with a genome integrated with the nucleic acid of claim 3.

9. A method for producing a monoclonal antibody, comprising culturing
   a host cell comprising an expression vector comprising a nucleic acid encoding the antibody according to claim 1, or
   a host cell with a genome integrated nucleic acid encoding the antibody according to claim 1
   to produce the monoclonal antibody according to claim 1.

10. A pharmaceutical composition comprising the monoclonal antibody according to claim 1 and a pharmaceutically acceptable carrier.

11. A kit or product comprising
    the monoclonal antibody according to claim 1, or
    a pharmaceutical composition comprising the monoclonal antibody according to claim 1 and a pharmaceutically acceptable carrier.

* * * * *

SEQUENCE LISTING

<160> NUMBER OF SEQ ID NOS: 18

<210> SEQ ID NO 1
<211> LENGTH: 10
<212> TYPE: PRT
<213> ORGANISM: Artificial Sequence
<220> FEATURE:
<223> OTHER INFORMATION: CDR-H1

<400> SEQUENCE: 1

Gly His Ile Phe Thr Asn Phe His Phe His
1               5                   10

<210> SEQ ID NO 2
<211> LENGTH: 10
<212> TYPE: PRT
<213> ORGANISM: Artificial Sequence
<220> FEATURE:
<223> OTHER INFORMATION: CDR-H1

<400> SEQUENCE: 2

Gly Tyr Ile Phe Thr Asn Tyr His Met His
1               5                   10

<210> SEQ ID NO 3
<211> LENGTH: 10
<212> TYPE: PRT
<213> ORGANISM: Artificial Sequence
<220> FEATURE:
<223> OTHER INFORMATION: CDR-H2

<400> SEQUENCE: 3

Gly Ile Tyr Pro Gly Asn Gly Asp Thr Phe
1               5                   10

<210> SEQ ID NO 4
<211> LENGTH: 10
<212> TYPE: PRT
<213> ORGANISM: Artificial Sequence
<220> FEATURE:
<223> OTHER INFORMATION: CDR-H2

<400> SEQUENCE: 4

Gly Ile Tyr Pro Gly Asn Gly Asp Ile Phe
1               5                   10

<210> SEQ ID NO 5
<211> LENGTH: 12
<212> TYPE: PRT

```
<213> ORGANISM: Artificial Sequence
<220> FEATURE:
<223> OTHER INFORMATION: CDR-H3

<400> SEQUENCE: 5

Gly Ser Tyr Tyr Gly Tyr Ile Asp Ala Met Asp Tyr
1               5                   10

<210> SEQ ID NO 6
<211> LENGTH: 12
<212> TYPE: PRT
<213> ORGANISM: Artificial Sequence
<220> FEATURE:
<223> OTHER INFORMATION: CDR-H3

<400> SEQUENCE: 6

Gly Ser Tyr Tyr Gly Tyr Ile Asp Ala Met Asp Tyr
1               5                   10

<210> SEQ ID NO 7
<211> LENGTH: 11
<212> TYPE: PRT
<213> ORGANISM: Artificial Sequence
<220> FEATURE:
<223> OTHER INFORMATION: CDR-L1

<400> SEQUENCE: 7

Arg Ala Ser Gln Asp Ile Ser Asn Tyr Leu Asn
1               5                   10

<210> SEQ ID NO 8
<211> LENGTH: 11
<212> TYPE: PRT
<213> ORGANISM: Artificial Sequence
<220> FEATURE:
<223> OTHER INFORMATION: CDR-L1

<400> SEQUENCE: 8

Arg Ala Ser Gln Asp Ile Ser Asn Asp Leu Asn
1               5                   10

<210> SEQ ID NO 9
<211> LENGTH: 7
<212> TYPE: PRT
<213> ORGANISM: Artificial Sequence
<220> FEATURE:
<223> OTHER INFORMATION: CDR-L2

<400> SEQUENCE: 9

Tyr Thr Ser Arg Leu His Ser
1               5

<210> SEQ ID NO 10
<211> LENGTH: 7
<212> TYPE: PRT
<213> ORGANISM: Artificial Sequence
<220> FEATURE:
<223> OTHER INFORMATION: CDR-L2

<400> SEQUENCE: 10

Tyr Thr Ser Arg Leu Pro Ser
1               5

<210> SEQ ID NO 11
<211> LENGTH: 9
<212> TYPE: PRT
<213> ORGANISM: Artificial Sequence
```

```
<220> FEATURE:
<223> OTHER INFORMATION: CDR-L3

<400> SEQUENCE: 11

Gln Gln Gly Asn Thr Leu Pro Trp Thr
1               5

<210> SEQ ID NO 12
<211> LENGTH: 9
<212> TYPE: PRT
<213> ORGANISM: Artificial Sequence
<220> FEATURE:
<223> OTHER INFORMATION: CDR-L3

<400> SEQUENCE: 12

Gln Gln Gly His Thr Leu Pro Trp Thr
1               5

<210> SEQ ID NO 13
<211> LENGTH: 107
<212> TYPE: PRT
<213> ORGANISM: Artificial Sequence
<220> FEATURE:
<223> OTHER INFORMATION: Light chain variable region

<400> SEQUENCE: 13

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Asn Tyr
            20                  25                  30

Leu Asn Trp Tyr Gln Gln Lys Pro Gly Lys Ala Val Lys Leu Leu Ile
        35                  40                  45

Tyr Tyr Thr Ser Arg Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Ile Ala Thr Tyr Tyr Cys Gln Gln Gly Asn Thr Leu Pro Trp
                85                  90                  95

Thr Phe Gly Gln Gly Thr Lys Leu Glu Ile Lys
            100                 105

<210> SEQ ID NO 14
<211> LENGTH: 107
<212> TYPE: PRT
<213> ORGANISM: Artificial Sequence
<220> FEATURE:
<223> OTHER INFORMATION: Light chain variable region

<400> SEQUENCE: 14

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Ile Ser Asn Asp
            20                  25                  30

Leu Asn Trp Tyr Gln Gln Lys Pro Gly Lys Ala Pro Lys Leu Leu Ile
        35                  40                  45

Tyr Tyr Thr Ser Arg Leu Pro Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Ile Ala Thr Tyr Tyr Cys Gln Gln Gly His Thr Leu Pro Trp
                85                  90                  95
```

```
                    Thr Phe Gly Gln Gly Thr Lys Leu Glu Ile Lys
                                100                 105

<210> SEQ ID NO 15
<211> LENGTH: 121
<212> TYPE: PRT
<213> ORGANISM: Artificial Sequence
<220> FEATURE:
<223> OTHER INFORMATION: Heavy chain variable region

<400> SEQUENCE: 15

Gln Val Gln Leu Val Gln Ser Gly Ala Glu Val Lys Lys Pro Gly Ser
1               5                   10                  15

Ser Val Lys Ile Ser Cys Lys Ala Ser Gly His Ile Phe Thr Asn Phe
                20                  25                  30

His Phe His Trp Val Arg Gln Ala Pro Gly Gln Gly Leu Glu Trp Ile
            35                  40                  45

Gly Gly Ile Tyr Pro Gly Asn Gly Asp Thr Phe Tyr Asn Gln Lys Phe
        50                  55                  60

Gln Gly Arg Ala Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Val Arg Gly Ser Tyr Tyr Gly Tyr Ile Asp Ala Met Asp Tyr Trp Gly
                100                 105                 110

Gln Gly Thr Ser Val Thr Val Ser Ser
            115                 120

<210> SEQ ID NO 16
<211> LENGTH: 121
<212> TYPE: PRT
<213> ORGANISM: Artificial Sequence
<220> FEATURE:
<223> OTHER INFORMATION: Heavy chain variable region

<400> SEQUENCE: 16

Gln Val Gln Leu Val Gln Ser Gly Ala Glu Val Lys Lys Pro Gly Ala
1               5                   10                  15

Ser Val Lys Met Ser Cys Lys Ala Ser Gly Tyr Ile Phe Thr Asn Tyr
                20                  25                  30

His Met His Trp Val Arg Gln Ala Pro Gly Gln Gly Leu Glu Trp Ile
            35                  40                  45

Gly Gly Ile Tyr Pro Gly Asn Gly Asp Ile Phe Tyr Ala Gln Lys Phe
        50                  55                  60

Gln Gly Arg Ala Thr Ile Thr Ala Asp Lys Ser Thr Ser Thr Ala Tyr
65                  70                  75                  80

Ile Glu Leu Ser Ser Met Arg Ser Glu Asp Thr Ala Val Tyr Tyr Cys
                85                  90                  95

Ala Arg Gly Ser Tyr Tyr Gly Tyr Ile Asp Ala Met Asp Tyr Trp Gly
                100                 105                 110

Gln Gly Thr Ser Val Thr Val Ser Ser
            115                 120

<210> SEQ ID NO 17
<211> LENGTH: 107
<212> TYPE: PRT
<213> ORGANISM: Artificial Sequence
<220> FEATURE:
<223> OTHER INFORMATION: Light chain sequence of GSK2857916
```

```
<400> SEQUENCE: 17

Asp Ile Gln Met Thr Gln Ser Pro Ser Ser Leu Ser Ala Ser Val Gly
1               5                   10                  15

Asp Arg Val Thr Ile Thr Cys Ser Ala Ser Gln Asp Ile Ser Asn Tyr
            20                  25                  30

Leu Asn Trp Tyr Gln Gln Lys Pro Gly Lys Ala Pro Lys Leu Leu Ile
        35                  40                  45

Tyr Tyr Thr Ser Asn Leu His Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Arg Lys Leu Pro Trp
                85                  90                  95

Thr Phe Gly Gln Gly Thr Lys Leu Glu Ile Lys
                100                 105

<210> SEQ ID NO 18
<211> LENGTH: 121
<212> TYPE: PRT
<213> ORGANISM: Artificial Sequence
<220> FEATURE:
<223> OTHER INFORMATION: Heavy chain sequence of GSK2857916

<400> SEQUENCE: 18

Gln Val Gln Leu Val Gln Ser Gly Ala Glu Val Lys Lys Pro Gly Ser
1               5                   10                  15

Ser Val Lys Val Ser Cys Lys Ala Ser Gly Gly Thr Phe Ser Asn Tyr
            20                  25                  30

Trp Met His Trp Val Arg Gln Ala Pro Gly Gln Gly Leu Glu Trp Met
        35                  40                  45

Gly Ala Thr Tyr Arg Gly His Ser Asp Thr Tyr Tyr Asn Gln Lys Phe
    50                  55                  60

Lys Gly Arg Val Thr Ile Thr Ala Asp Lys Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Gly Ala Ile Tyr Asp Gly Tyr Asp Val Leu Asp Asn Trp Gly
                100                 105                 110

Gln Gly Thr Leu Val Thr Val Ser Ser
        115                 120
```